US012615477B2

(12) United States Patent
Ye

(10) Patent No.: US 12,615,477 B2
(45) Date of Patent: Apr. 28, 2026

(54) SOUND APPARATUS HAVING VIBRATION DEVICES

(71) Applicant: LG Display Co., Ltd., Seoul (KR)

(72) Inventor: Jaehun Ye, Tokyo (JP)

(73) Assignee: LG Display Co., Ltd., Seoul (KR)

( * ) Notice: Subject to any disclaimer, the term of this patent is extended or adjusted under 35 U.S.C. 154(b) by 173 days.

(21) Appl. No.: 18/529,982

(22) Filed: Dec. 5, 2023

(65) Prior Publication Data

US 2024/0214736 A1 Jun. 27, 2024

(30) Foreign Application Priority Data

Dec. 23, 2022 (JP) ................................ 2022-206165

(51) Int. Cl.
*H04R 7/04* (2006.01)
*H04R 17/00* (2006.01)

(52) U.S. Cl.
CPC ............... *H04R 7/04* (2013.01); *H04R 17/00* (2013.01); *H04R 2499/15* (2013.01)

(58) Field of Classification Search
CPC .......... H04R 7/04; H04R 7/045; H04R 17/00; H04R 2499/15; H04R 2440/00; H04R 2440/01; H04R 2440/03; H04R 2440/05; H04R 2440/07; H04R 2217/00; H04R 2217/01; H04R 2217/03
USPC .................................................. 381/152, 190
See application file for complete search history.

(56) References Cited

U.S. PATENT DOCUMENTS

| | | | | |
|---|---|---|---|---|
| 7,635,941 B2 * | 12/2009 | Bank | ........................ | H04R 7/18 310/348 |
| 9,190,938 B2 * | 11/2015 | Hwu | ...................... | H02N 2/001 |
| 12,200,443 B2 * | 1/2025 | Kim | ..................... | H04R 17/005 |
| 2021/0176566 A1 | 6/2021 | Ye | | |
| 2021/0392439 A1 * | 12/2021 | Ye | .......................... | H04R 17/00 |

FOREIGN PATENT DOCUMENTS

| | | |
|---|---|---|
| JP | 2019219414 A | 12/2019 |
| KR | 20170079494 A | 7/2017 |
| KR | 20170091122 A | 8/2017 |
| KR | 20170130210 A | 11/2017 |

* cited by examiner

*Primary Examiner* — Ahmad F. Matar
*Assistant Examiner* — Sabrina Diaz
(74) *Attorney, Agent, or Firm* — Seed Intellectual Property Law Group LLP

(57) ABSTRACT

A sound apparatus comprises a first vibration device which vibrates by an input driving signal, a first substrate including a first main surface and a second main surface facing each other, wherein the first vibration device is disposed on at least a portion of the first main surface of the first substrate, a second substrate including a first main surface and a second main surface facing each other, wherein a portion of the first main surface of the second substrate is disposed to be adjacent to a portion of the second main surface of the first substrate, a second vibration device disposed on at least a portion of the second main surface of the second substrate and vibrates by the input driving signal, a vibration member, a first elastic member connecting the first substrate and the vibration member, and a second elastic member connecting the first substrate and the vibration member.

24 Claims, 20 Drawing Sheets

SOUND APPARATUS HAVING VIBRATION DEVICES

CROSS-REFERENCE TO RELATED APPLICATIONS

This application claims the benefit of and priority to Japanese Patent Application No. 2022-206165 filed on Dec. 23, 2022, the entirety of each which is hereby incorporated by reference for all purposes as if fully set forth herein.

BACKGROUND

Technical Field

The present disclosure relates to a sound apparatus.

Description of the Related Art

Sound apparatuses include a vibration meter which converts an input electrical signal into a physical vibration. Piezoelectric speakers consisting of piezoelectric devices including ferroelectric ceramic or the like is lightweight and has low power consumption, and thus, is used for various purposes.

Piezoelectric devices used to piezoelectric speakers are limited in vibration width (or displacement width), and due to this, there is a case where a sound pressure level is not sufficient.

BRIEF SUMMARY

The present disclosure has been implemented based on such a problem, and the inventors of present disclosure have performed various experiments for implementing a vibration apparatus for enhancing sound quality. Based on the various experiments, the inventors have invented a new sound apparatus for enhancing sound quality. One or more embodiments of the present disclosure is directed to providing a sound apparatus in which sound quality is enhanced.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and aspects of the present disclosure, as embodied and broadly described herein, in one or more aspects, a sound apparatus may comprise a first vibration device which vibrates by an input driving signal, a first substrate which includes a first main surface and a second main surface facing each other, wherein the first vibration device is disposed on at least a portion of the first main surface of the first substrate, a second substrate which includes a first main surface and a second main surface facing each other, wherein a portion of the first main surface of the second substrate is disposed to be adjacent to a portion of the second main surface of the first substrate, a second vibration device which is disposed on at least a portion of the second main surface of the second substrate and vibrates by the input driving signal, a vibration member, a first member configured to connect the first substrate and the vibration member, and a second member configured to connect the first substrate and the vibration member.

In one or more aspects, a sound apparatus according to an embodiment of the present disclosure may comprise a first vibration device which vibrates by an input driving signal; a first substrate which includes a first main surface and a second main surface facing each other, the first vibration device is disposed on at least a portion of the first main surface of the first substrate; a second vibration device which is disposed on a portion of the second main surface of the first substrate and vibrates by the input driving signal; a second substrate which includes a first main surface and a second main surface facing each other, wherein at least a portion of the first main surface of the second substrate is disposed to be adjacent to the second vibration device; a vibration member; a first member configured to connect the first substrate and the vibration member; and a second member configured to connect the second substrate and the vibration member.

In one or more aspects, a sound apparatus may comprise a first vibration device which vibrates by an input driving signal, a first substrate which includes a first main surface and a second main surface facing each other, wherein the first vibration device is disposed on at least a portion of the first main surface of the first substrate; a second substrate which includes a first main surface and a second main surface facing each other, wherein a portion of the first main surface of the second substrate is disposed to face a portion of the second main surface of the first substrate; a second vibration device which is disposed on at least a portion of the second substrate and vibrates by an input driving signal; a vibration member; a first member configured to connect the first substrate to the vibration member; and a second member configured to connect the second vibration device or the second substrate to the vibration member.

In one or more aspects, a sound apparatus according to an embodiment of the present disclosure may comprise a vibration member, first and second substrates intersecting each other, a first vibration device connected to the first substrate, a second vibration device connected to the second substrate, and a transmission member for transmitting a vibration of each of the first and second substrates to the vibration member.

Specific details according to various examples of the present disclosure are included in the description and drawings below.

According to one or more embodiments of the present disclosure, a sound apparatus where sound quality is enhanced may be provided.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are examples and explanatory, and are intended to provide further explanation of the disclosures as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain principles of the disclosure.

Figure 1:
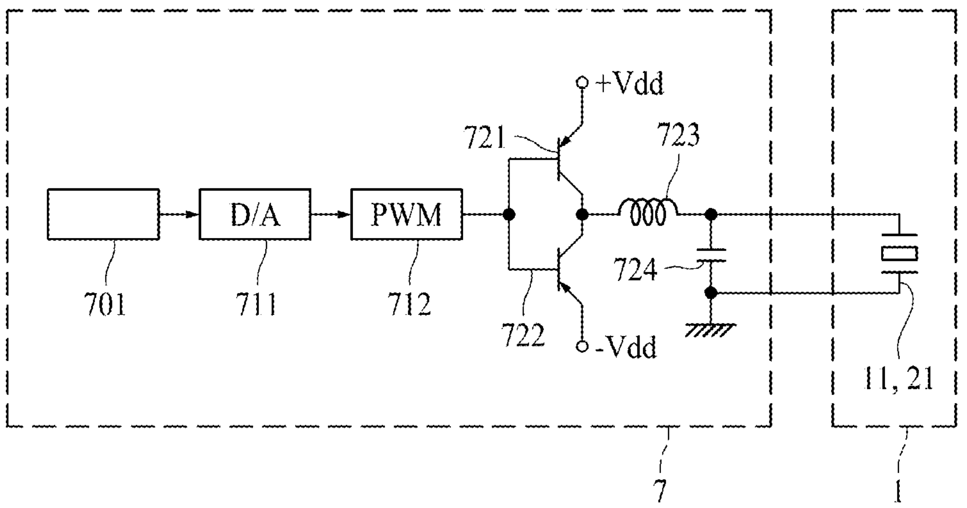
FIG. 1 is a block diagram illustrating a configuration of a sound apparatus and a host system according to a first embodiment of the present disclosure.

Throughout the drawings and the detailed description, unless otherwise described, same drawing reference numerals should be understood to refer to a same elements, features, or structures. The sizes, lengths, and thicknesses of layers, regions and elements, and depiction thereof may be exaggerated for clarity, illustration, or convenience.

DETAILED DESCRIPTION

Reference is now made in detail to embodiments of the present disclosure, examples of which may be illustrated in the accompanying drawings. In the following description, where a detailed description of relevant known functions or configurations may unnecessarily obscure aspects of the present disclosure, a detailed description of such known functions or configurations may be omitted for brevity. The progression of processing steps and/or operations described is an example, and the sequence of steps and/or operations is not limited to that set forth herein and may be changed, with the exception of steps and/or operations necessarily occurring in a particular order.

Advantages and features of the present disclosure, and implementation methods thereof, are clarified through the following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to understand the inventive concepts fully without limiting the protected scope of the present disclosure.

The shapes, dimensions, areas, ratios, angles, numbers, and the like, which are illustrated in the drawings to describe various example embodiments of the present disclosure, are merely given by way of example. Therefore, the present disclosure is not limited to the illustrations in the drawings. Like reference numerals generally denote like elements throughout the specification, unless otherwise specified.

Where a term like "comprise," "have," "include," "contain," "constitute," "made up of," or "formed of" is used, one or more other elements may be added unless a more limiting term, such as "only" or the like, is used. The terms and names used in the present disclosure are merely used to describe particular embodiments and are not intended to limit the scope of the present disclosure. An element described in the singular form is intended to include a plurality of elements, and vice versa, unless the context clearly indicates otherwise.

The word "exemplary" is used to mean serving as an example or illustration, unless otherwise specified. Embodiments are example embodiments. Aspects are example aspects. Any implementation described herein as an "example" is not necessarily to be construed as preferred or advantageous over other implementations.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, noise, or the like). Further, the term "may" encompasses all the meanings of the term "can."

In describing a positional relationship where the positional relationship between two parts is described, for example, using "on," "over," "under," "above," "below," "beneath," "near," "close to," "adjacent to," "beside," "next to," "on a side of" or the like, one or more other parts may be located between the two parts unless a more limiting term, such as "immediate(ly)," "direct(ly)," or "close(ly)," is used. For example, where a structure is described as being positioned "on," "over," "under," "above," "below," "beneath," "near," "close to," "adjacent to," "beside," "next to" or "on a side of" another structure, this description should be construed as including a case in which the structures contact each other as well as a case in which one or more additional structures are disposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference, unless otherwise specified.

In describing a temporal relationship, where the temporal order is described as, for example, "after," "subsequent," "next," "before," "preceding," "prior to," or the like, a case that is not consecutive or not sequential may be included unless a more limiting term, such as "just," "immediate(ly)," or "direct(ly)," is used.

It will be understood that, although the term "first," "second," "A," "B," "(a)," and "(b)," or the like may be used herein to describe various elements, these elements should not be limited by these terms, for example, to any particular order, precedence, or number of elements. These terms are only used to distinguish one element from another. For example, a first element could be termed a second element, and, similarly, a second element could be termed a first element, without departing from the scope of the present disclosure. Furthermore, the first element, the second element, and the like may be arbitrarily named according to the convenience of those skilled in the art without departing from the scope of the present disclosure. The terms "first," "second," and the like may be used to distinguish components from each other, but the functions or structures of the components are not limited by ordinal numbers or component names in front of the components.

In describing elements of the present disclosure, the terms "first," "second," "A," "B," "(a)," "(b)," or the like may be used. These terms are intended to identify the corresponding element(s) from the other element(s), and are not used to define the essence, basis, order, or number of the elements.

Where an element is described as "connected," "coupled," "attached," or "adhered" to another element or layer, the element or layer can not only be directly connected, coupled, attached, or adhered to another element or layer, but also be indirectly connected, coupled, attached, or adhered to another element or layer with one or more intervening elements or layers disposed or interposed between the elements or layers, unless otherwise specified.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

Such terms as a "line" or "direction" should not be interpreted only based on a geometrical relationship in which the respective lines or directions are parallel or perpendicular to each other. Such terms may mean a wider range of lines or directions within which the components of the present disclosure can operate functionally.

The term "at least one" should be understood as including any and all combinations of one or more of the associated listed items. For example, the meaning of "at least one of a first item, a second item, and a third item" encompasses the combination of all three listed items, combinations of any two the first item, the second item, and the third item, as well as any individual item, the first item, the second item, or the third item.

The expression of a first element, a second elements, "and/or" a third element should be understood to encompass one of the first, second, and third elements, as well as any and all combinations of the first, second and third elements. By way of example, A, B and/or C encompass only A; only B; only C; any combination of two of A, B, and C; and all of A, B, and C. Furthermore, an expression "element A/element B" may be understood as element A and/or element B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two.

In one or more aspects, the phrases "each other" and "one another" may be used interchangeably simply for convenience unless stated otherwise. For example, an expression "different from each other" may be understood as different from one another. In another example, an expression "different from one another" may be understood as different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

Features of various embodiments of the present disclosure may be partially or wholly coupled to or combined with each other, and may be operated, linked, or driven together in various ways. Embodiments of the present disclosure may be carried out independently from each other, or may be carried out together in a co-dependent or related relationship. In one or more aspects, the components of each apparatus according to various embodiments of the present disclosure may be operatively coupled and configured.

Unless otherwise defined, the terms (including technical and scientific terms) used herein have a same meaning as commonly understood by one of ordinary skill in the art to which example embodiments belong. It should be further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

In the following description, various example embodiments of the present disclosure are described in detail with reference to the accompanying drawings. With respect to reference numerals to elements of each of the drawings, a same elements may be illustrated in other drawings, and like reference numerals may refer to like elements unless stated otherwise. In addition, for convenience of description, a scale, dimension, size, and thickness of each of the elements illustrated in the accompanying drawings may be different from an actual scale, dimension, size, and thickness. Thus, embodiments of the present disclosure are not limited to a scale, dimension, size, or thickness illustrated in the drawings

First Embodiment

FIG. 1 is a block diagram illustrating a configuration of a sound apparatus 1 according to an embodiment of the present disclosure. A driving signal (or a sound signal) input to the sound apparatus 1 will be described with reference to FIG. 1. The sound apparatus 1 may be individually used as a speaker, or may be embedded into an advertising signboard, a poster, a noticeboard, a vehicle, a building, or display apparatus or the like. The use of the sound apparatus 1 according to the embodiment of the present disclosure is not particularly limited thereto.

The sound apparatus 1 may include one or two or more vibration devices 11 and 21. The vibration devices 11 and 21 may be a device which is displaced based on an inverse piezoelectric effect when a voltage is applied based on a driving signal input thereto. The vibration devices 11 and 21, for example, may be an element which is flexurally displaced based on a voltage such as bimorph, unimorph, or multimorph, without being limited thereto. An input driving signal may be an alternating current (AC) voltage generally, and thus, the vibration device 11 and 21 may vibrates based on the input driving signal to generate a vibration and/or a sound. For example, the vibration devices 11 and 21 may be a vibration generating device, a sound generating device, or a voice generating device.

A host system 7 may be a system including an apparatus or a plurality of apparatuses, which supply the driving signal to control the sound apparatus 1. However, the host system 7 may further supply other signals such as an image signal (for example, RGB data or RGBW data) and a timing signal (for example, a vertical synchronization signal, a horizontal synchronization signal, and a data enable signal, etc.) or the like based on the use purpose of the sound apparatus 1. The host system 7 may be, for example, a source sound reproduction apparatus, a local broadcast apparatus, a radio broadcast reproduction system, a television (TV) system, a set-top box, a navigation system, an optical disk player, a computer, a home theater system, a video phone system, or the like. Further, the sound apparatus 1 and the host system 7 may be an integrated apparatus or separate apparatuses.

The host system 7 may include an input unit 701, a digital-to-analog (D/A) converter 711, a pulse width modulation (PWM) circuit 712, transistors 721 and 722, a coil 723, and a capacitor 724. The input unit 701 may input a digital signal to control the vibration devices 11 and 21. The D/A converter 211 may convert the digital signal input from the input unit 701 into an analog signal. The PWM circuit 712 may pulse-width-modulate the analog signal input from the D/A converter 711 to output a pulse signal. The transistors 721 and 722 may include a PNP type transistor 721 and an NPN type transistor 722. The PNP type transistor 721 and the NPN type transistor 722 may configure a push-pull circuit. For example, a collector terminal of each of the transistors 721 and 722 may be connected to each other, and a base terminal of each of the transistors 721 and 722 may be connected to each other. A positive voltage +Vdd may be applied to an emitter terminal of the transistor 721. A negative voltage −Vdd may be applied to an emitter terminal of the transistor 722. The pulse signal may be applied to the base terminals of the transistors 721 and 722 from the PWM circuit 712, and the transistors 721 and 722 may be complementarily turned on or turned off based on the pulse signal. For example, when a positive pulse signal is applied to the base terminals of the transistors 721 and 722, the transistor 721 may be turned on, and the transistor 722 may be turned off. Therefore, a voltage at the collector terminal of each of the transistors 721 and 722 may be a voltage +Vdd. On the other hand, when a negative pulse signal is applied to the base terminals of the transistors 721 and 722, the transistor 721 may be turned off, and the transistor 722 may be turned on. Therefore, a voltage at the collector terminal of each of the transistors 721 and 722 may be a voltage −Vdd. Further, when a potential of the pulse signal is a ground potential, the transistors 721 and 722 may be turned off simultaneously. The coil 723 and the capacitor 724 may each function as a low pass filter and may smooth the pulse signal at the collector terminal of each of the transistors 721 and 722 to output a driving signal (or a sound signal) to the vibration devices 11 and 21. Embodiments are not limited thereto. As an example, at least one of the above-mentioned components (e.g., the coil 723 and the capacitor 724) could be omitted, and/or at least one additional component could be further included. As an example, the configuration of the host system 7 is not limited to the above configuration, as long as it could generate input driving signal such as an alternating current (AC) voltage.

Figure 2:
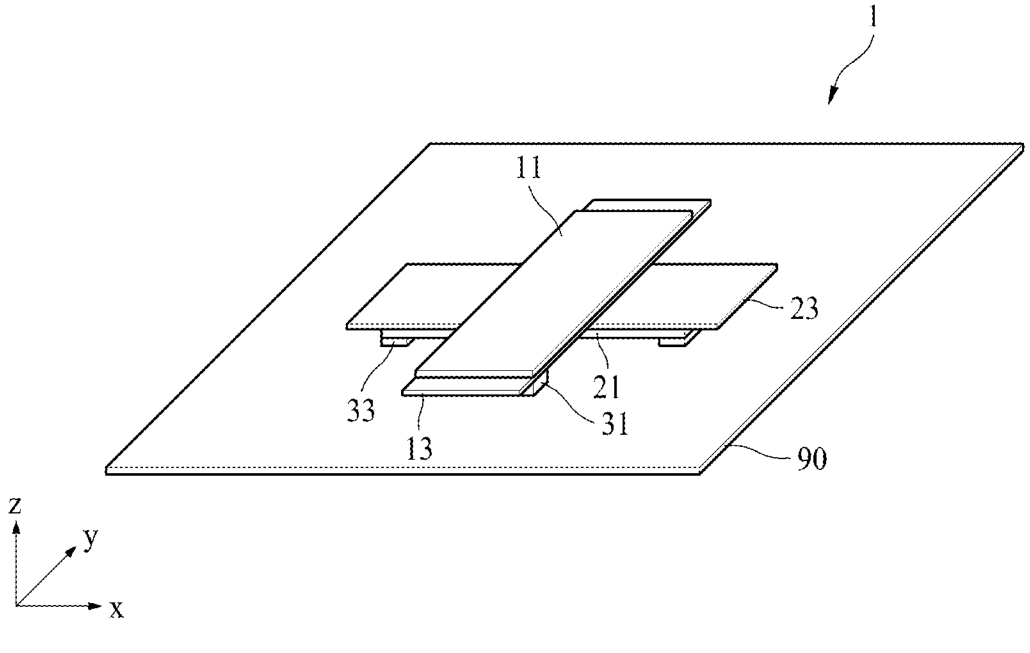
FIG. 2 is a perspective view illustrating a configuration of a sound apparatus according to a first embodiment of the present disclosure.
Figure 3:
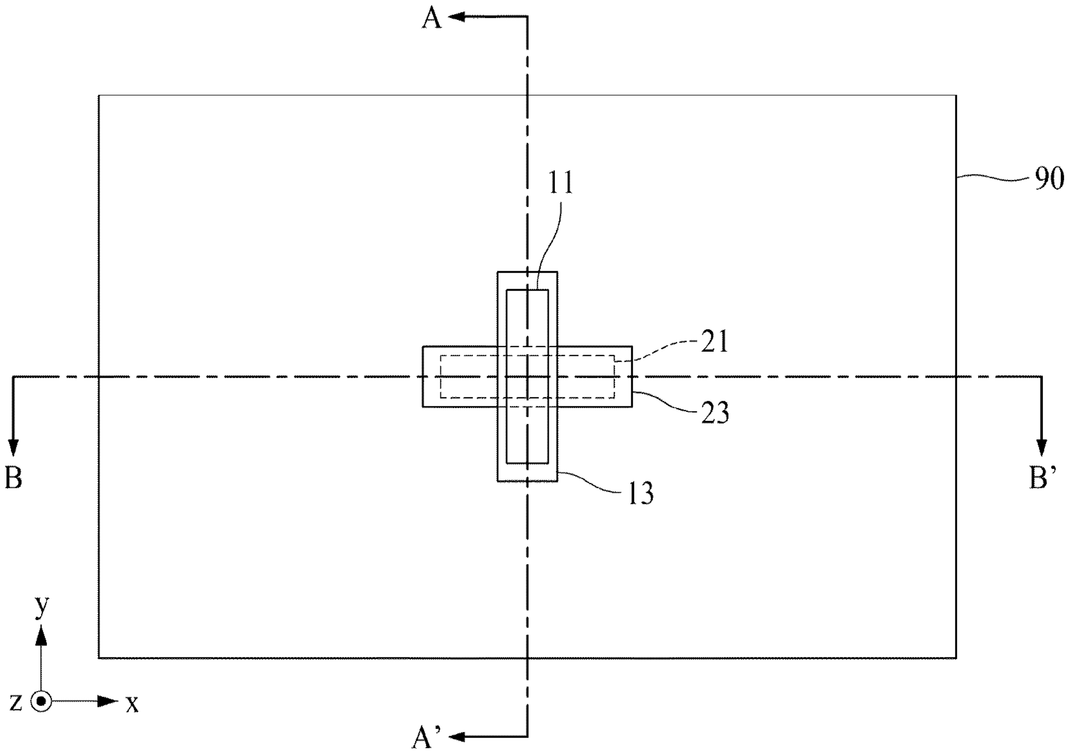
FIG. 3 is a plan view illustrating a configuration of a sound apparatus according to a first embodiment of the present disclosure.
Figure 4:
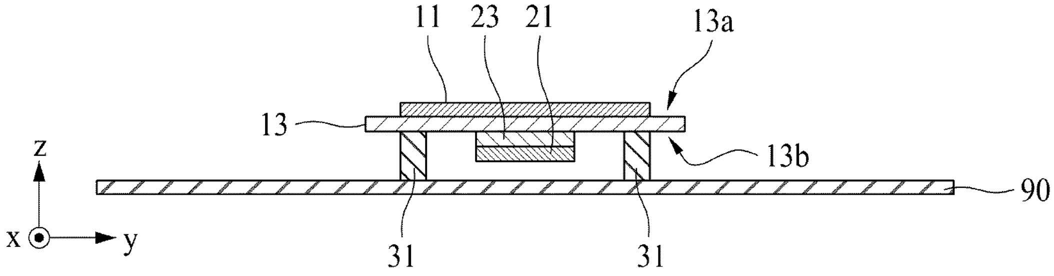
FIG. 4 is a cross-sectional view illustrating a configuration of a sound apparatus according to a first embodiment of the present disclosure.
Figure 5:
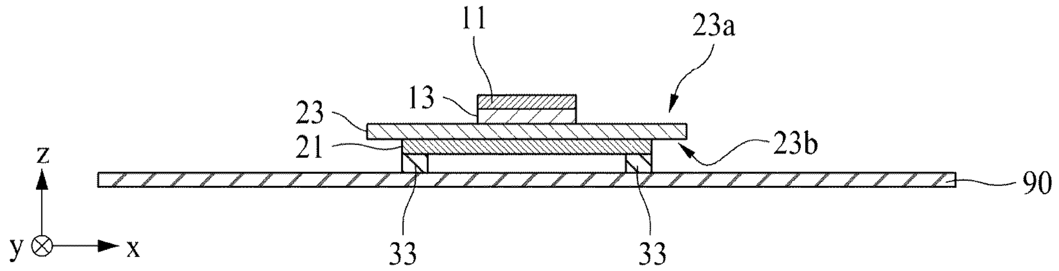
FIG. 5 is cross-sectional views illustrating a configuration of a sound apparatus according to a first embodiment of the present disclosure.
Figure 6:
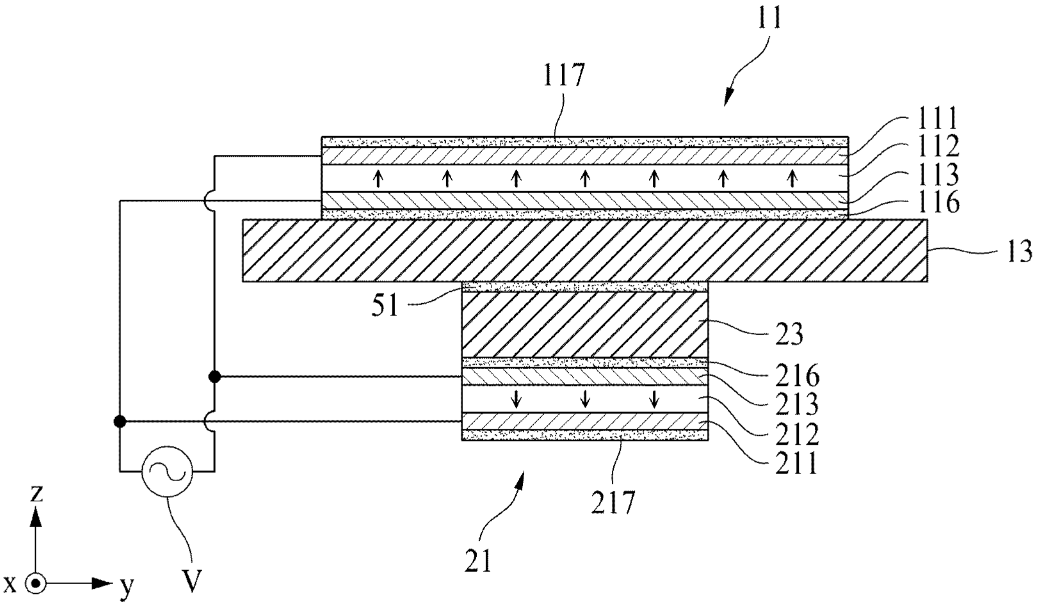
FIG. 6 is a cross-sectional view illustrating a structure of a sound apparatus according to a first embodiment of the present disclosure in more detail.

FIG. 2 is a perspective view illustrating a configuration of a sound apparatus according to the embodiment of the present disclosure. FIG. 3 is a plan view illustrating a configuration of a sound apparatus according to the embodiment of the present disclosure. FIGS. 4 and 5 are cross-sectional views illustrating a configuration of a sound apparatus according to the embodiment of the present disclosure. FIG. 6 is a cross-sectional view illustrating a structure of a vibration device according to the embodiment of the present disclosure in more detail. FIGS. 4 and 6 are cross-sectional views taken along line A-A' of FIG. 3. FIG. 5 is a cross-sectional view taken along line B-B' of FIG. 3. A detailed configuration of the sound apparatus 1 according to the embodiment of the present disclosure will be described with reference to FIGS. 2 to 6.

As shown in FIG. 2, the sound apparatus 1 may include a first vibration device 11, a first substrate 13, a second vibration device 21, a second substrate 23, a first elastic member 31, a second elastic member 33, and a vibration member 90. As shown in FIGS. 2 and 3, when seen in a plane, the first vibration device 11, the second vibration device 21, the first substrate 13, and the second substrate 23 may have a rectangular flat plate shape, without being limited thereto. As an example, the first vibration device 11, the second vibration device 21, the first substrate 13, and the second substrate 23 may also have a rectangular flat plate shape with round corners, an oval shape, an elliptic shape, a parallelogram shape, etc. In FIGS. 2 to 6, a coordinate-axis is illustrated where directions of short sides direction of the first vibration device 11 are the x-axis, long sides direction of the first vibration device 11 are the y-axis, and a direction perpendicular to the x-axis and the y-axis is the z-axis. The long side direction of the first vibration device 11 may be referred to as a first direction, and a long side direction of the second vibration device 21 may be referred to as a second direction. In the embodiment of the present disclosure, when seen in a plane, the first direction and the second direction may be perpendicular, but the arrangement of the first vibration device 11 and the second vibration device 21 is not particularly limited thereto. The first substrate 13 and the second substrate 23 may each include two main surfaces facing each other. For example, in the two main surfaces of the first substrate 13, the surface in a forward direction (or positive direction) of the z-axis is referred to as a first main surface 13*a*, and a surface in a sub-direction (or rearward direction or negative direction) of the z-axis may be referred to as a second main surface 13*b*. Similarly, in the two main surfaces of the second substrate 23, the surface in a forward direction of the z-axis is referred to as a first main surface 23*a*, and the surface in a sub-direction of the z-axis is referred to as a second main surface 23*b*.

The first substrate 13 may be connected to the first vibration device 11. For example, the first main surface 13*a* of the first substrate 13 may be connected to the first vibration device 11. As shown in FIGS. 2 and 4, in the embodiment of the present disclosure, a portion of the first main surface 13*a* of the first substrate 13 may be connected to the first vibration device 11. However, as described below, an entire surface of the first main surface 13*a* of the first substrate 13 may be configured to be connected to the first vibration device 11. As an example, the first main surface 13*a* of the first substrate 13 may be configured to be connected to the entirety of or only a portion of the first vibration device 11. The first substrate 13 may be composed of a material comprising metal such as, for example, stainless steel, but embodiments of present disclosure are not limited thereto. As an example, the first substrate 13 may be composed of other inorganic material such as ceramics or even organic material such as plastic.

The first substrate 13 may be connected to the second substrate 23. For example, the first substrate 13 and the second substrate 23 may be connected to each other by an adhesive or flexible adhesive, a coupling member or an elastic coupling member, a magnetic force, etc. The second main surface 13*b* of the first substrate 13 may be connected to the first main surface 23*a* of the second substrate 23. As shown in FIGS. 2 and 4, in the embodiment of the present disclosure, a portion of the second main surface 13*b* of the first substrate 13 may be connected to a portion of the first main surface 23*a* of the second substrate 23. Therefore, as shown in FIG. 3, when seen in a plane, the first substrate 13 and the second substrate 23 may be disposed to intersect. For example, when seen in a plane, the first substrate 13 and the second substrate 23 may be disposed to have a "+" shape. For example, the first substrate 13 and the second substrate 23 may be disposed to have a "+" shape on a plan view.

The second substrate 23 may be connected to the second vibration device 21. For example, the second main surface 23*b* of the second substrate 23 may be connected to the second vibration device 21. As shown in FIG. 5, in the embodiment of the present disclosure, a portion of the second main surface 23*b* of the second substrate 23 may be connected to the second vibration device 21. However, as described below, the entire surface of the second main surface 23*b* of the second substrate 23 may be configured to be connected to the second vibration device 21. As an example, the second main surface 23*b* of the second substrate 23 may be configured to be connected to the entirety of or only a portion of the second vibration device 21. For example, the second substrate 23 may be composed of a material comprising metal such as, for example, stainless steel, but embodiments of present disclosure are not limited thereto. As an example, the second substrate 23 may be composed of other inorganic material such as ceramics or even organic material such as plastic.

The first substrate 13 may be connected to the vibration member 90 through the plurality of first elastic members 31. For example, the second main surface 13*b* of the first substrate 13 may be connected to the vibration member 90 through two or more first elastic members 31 While suppressing generation of harmonics, when seen in a plane, the first elastic member 31 may be disposed within an area in which the first vibration device 11 and the first substrate 13 overlap, but embodiments of present disclosure are not limited thereto. Particularly, as shown in FIG. 4, an exposed outer surface of the end (or edge portion) of the first elastic member 31 may be disposed to correspond to the surface in the end (or edge portion) of the long side direction of the first vibration device 11, but embodiments of present disclosure are not limited thereto. In this case, when seen in a plane, one end of the first elastic member 31 may be disposed at a position corresponding to the end portion in the long side direction of the first vibration device 11 within the area where the first vibration device 11 and the first substrate 13 overlap. Embodiments are not limited thereto. As an example, when seen in a plane, one end of the first elastic member 31 may be disposed at a position inner or outer than the end portion in the long side direction of the first vibration device 11. For example, the first elastic member 31 may be a material having elasticity. As an example, the first elastic member 31 may be a material such as resin, rubber, metal, etc., without being limited thereto. For example, the plurality of first elastic members 31 may have a rectangular shape, that is, a hexahedral shape on a plan view from the z-axis direction, but embodiments of present disclosure are not limited thereto. For example, the plurality of first elastic members 31 may have a circular shape, that is, a cylinder shape, or an oval shape, such as an elliptic cylinder shape, on a plan view from the z-axis direction. For example, the plurality of first elastic members 31 may be transmission members or vibration transmission members for transmitting a vibration of the first substrate 13 according to the vibration of the first vibration device 11 to the vibration member 90.

The vibration member 90 may include one or more material of metal, resin, glass, hard paper, mirror, wood, rubber, plastic, fiber, cloth, paper, leather, or carbon or the like, but embodiments of the present disclosure are not limited thereto. For example, the paper may be cone paper for speakers. For example, the cone paper may be pulp or foamed plastic, or the like, but embodiments of the present disclosure are not limited thereto.

Furthermore, for example, the vibration member 90 according to another embodiment of the present disclosure may include a display panel including a pixel configured to display an image, a screen panel on which an image is projected from a display apparatus, a lighting panel, a light emitting diode lighting panel, an organic light emitting lighting panel, an inorganic light emitting lighting panel, a signage panel, a vehicular interior material, a vehicular glass window, a vehicular exterior material, a vehicular seat interior material, a building ceiling material, a building interior material, a building glass window, an aircraft interior material, an aircraft glass window, or a mirror, but embodiments of the present disclosure are not limited thereto, for example, the vibration member 90 may include one or more of a display panel having a plurality of pixels configured to display an image, and the display panel may be a curved display panel, or may be any type of display panel, such as a liquid crystal display panel, an organic light emitting display panel, a quantum dot light emitting display panel, a micro light emitting diode display panel, an electro-wetting display panel, and an electrophoresis display panel, or the like. In addition, for example, the display panel may be a flexible display panel. For example, the display panel may a flexible light emitting display panel, a flexible electrophoretic display panel, a flexible electro-wetting display panel, a flexible micro light emitting diode display panel, or a flexible quantum dot light emitting display panel, but embodiments of the present disclosure are not limited thereto. An example of resin that may be used in the first elastic member 31 may include polyurethane or polyethylene terephthalate PET, but embodiments of the present disclosure are not limited thereto. An example of metal that may be used in the vibration member 90 may include stainless steel, but embodiments of the present disclosure are not limited thereto.

The second vibration device 21 may be connected to the vibration member 90 through the plurality of second elastic members 33. For example, the second vibration device 21 may be connected to the vibration member 90 through two or more second elastic members 33. When seen in a plane, the second elastic member 33 may be disposed in an area in which the second vibration device 21 and the second substrate 23 overlap. In the embodiment of the present disclosure, as shown in FIG. 5, an exposed outer surface of the end (or edge portion) of the second elastic member 33 may be disposed to correspond to the surface in the end (or edge portion) of the long side direction of the second vibration device 21. Embodiments are not limited thereto. As an example, when seen in a plane, one end of the second elastic member 33 may be disposed at a position inner or outer than the end portion in the long side direction of the second vibration device 21. The second elastic member 33 may be a material similar to that of the first elastic member 31. For example, the plurality of second elastic members 33 may have a rectangular shape, that is, a hexahedral shape on a plan view from the z-axis direction, but embodiments of the present disclosure are not limited thereto. For example, the plurality of second elastic members 33 may have a circular shape, that is, a cylinder shape, or an oval shape, such as an elliptic cylinder shape, on a plan view from the z-axis direction. For example, the plurality of second elastic members 33 may be transmission members or vibration transmission members for transmitting the vibration of the second substrate 23 according to the vibration of the second vibration device 21 to the vibration member 90.

The embodiment of the structure of the sound apparatus 1 will be described in more detail with reference to FIG. 6. FIG. 6 is an enlarged view of illustrating the first vibration device 11, the first substrate 13, the second vibration device 21, and the second substrate 23 in a same section as that of FIG. 4. Furthermore, in FIG. 6, a connection relationship of each electrode included in the first vibration device 11 and the second vibration device 21 schematically illustrates by a circuit diagram to describe a method for inputting a sound signal to the vibration device 11.

The first vibration device 11 may include an electrode (or first electrode) 111, a vibration layer (or piezoelectric layer) 112, an electrode (or second electrode) 113, an adhesive layer 116, and a protection layer 117. The electrode 111 and the electrode 113 may be arranged with the vibration layer 112 interposed in-between at a thickness direction and may be configured to apply a voltage to the vibration layer 112. The adhesive layer 116 may be a layer for connecting the first vibration device 11 to the first main surface 13*a* of the first substrate 13. The protection layer (or protection member) 117 may be configured to protect and insulate an upper surface of the electrode 111. For example, the protection layer 117 may be omitted. In the present embodiment, a polarization (poling) direction of the vibration layer 112 may be the forward direction or sub-direction of the z-axis, as shown in FIG. 6. In addition, wires (or lines) for applying a voltage to each electrode may be connected to the electrodes 111 and 113 by soldering or the like, without being limited thereto.

Similarly, the second vibration device 21 may include an electrode (or first electrode) 211, a vibration layer (or piezoelectric layer) 212, an electrode (or second electrode) 213, an adhesive layer 216, and a protection layer 217. The electrode 211 and the electrode 213 may be arranged with the vibration layer 212 interposed in-between at a thickness direction and may be configured to apply a voltage to the vibration layer 212. The adhesive layer 216 may be a layer for connecting the second vibration device 21 to the second main surface 23*b* of the second substrate 23. The protection layer 217 may protect and insulate an lower surface of the electrode 211. For example, the protection layer 217 may be omitted. In the present embodiment, a polarization direction of the vibration layer 212 may be the sub-direction or forward direction of the z-axis, as shown in FIG. 6. Also, wires (or lines) for applying a voltage to each electrode may be connected to the electrodes 211 and 213 by soldering or the like, without being limited thereto. A portion of the second main surface 13*b* of the first substrate 13 may be adhered to a portion of the first main surface 23*a* of the second substrate 23 through the adhesive layer 51.

Material of the vibration layer 112 and the vibration layer 212 is not particularly limited thereto, but may include ferroelectric ceramic, having good piezoelectric properties, such as lead zirconate titanate (PZT)-based materials or the like so as to increase the amount of displacement, but embodiments of the present disclosure are not limited thereto. For example, material of the vibration layer 112 and the vibration layer 212 may be configured as a piezoelectric material of a ceramic-based material capable of implementing a relatively strong vibration, or may be configured as a piezoelectric ceramic material having a perovskite-based crystal structure. For example, material of the vibration layer 112 and the vibration layer 212 may have a polycrystalline structure or a single-crystalline structure. For example, material of the vibration layer 112 and the vibration layer 212 may be configured as polycrystalline ceramic or single-crystalline ceramic, but embodiments of the present disclosure are not limited thereto. For example, the vibration layer 112 and the vibration layer 212 may be configured as a piezoelectric material including lead (Pb) or a piezoelectric material not including lead (Pb). For example, the piezoelectric material including lead (Pb) may include one or more of a lead zirconate titanate (PZT)-based material, a lead zirconate nickel niobate (PZNN)-based material, a lead magnesium niobate (PMN)-based material, a lead nickel niobate (PNN)-based material, a lead zirconate niobate (PZN)-based material, or a lead indium niobate (PIN)-based material, but embodiments of the present disclosure are not limited thereto. For example, the piezoelectric material not including lead (Pb) may include one or more of barium titanate ($BaTiO_3$), calcium titanate ($CaTiO_3$), and strontium titanate ($SrTiO_3$), but embodiments of the present disclosure are not limited thereto. As an example, the vibration layer 112 and the vibration layer 212 may include the same or different materials. The adhesive layer 51, the adhesive layer 116, and the adhesive layer 216 may be a compressed resin material, an adhesive, an adhesive tape, or the like, without being limited thereto. For example, the adhesive layer 51 may have an elastic modulus which is lower than that of the adhesive layer 116 and the adhesive layer 216. Further, although not shown in a configuration of FIG. 6, optionally, a lateral surface of the first vibration device 11 may be covered by an insulator such as resin or the like while preventing an electrical short circuit between the first vibration device 11 and the other members.

A voltage applied to the vibration device 11 and 21 may be based on the sound signal, and thus, may be an AC voltage corresponding to a frequency of a sound which is to be generated. In FIG. 6, an alternating current (AC) voltage may be represented by a circuit sign of an AC power source V. One terminal (or a first terminal) of the AC power source V may be connected to the electrode 111 and the electrode 213, and the other terminal (or a second terminal) of the AC power source V may be connected to the electrode 113 and the electrode 211, but embodiments of the present disclosure are not limited thereto.

When an AC voltage is applied to the electrode 111 (or a first electrode or a first electrode layer) and the electrode 113 (or a second electrode or a second electrode layer), the vibration layer 112 may contract and expand and a periodic stress may be applied to the first vibration member 90 through the first substrate 13 and the first elastic member 31, and thus, the vibration layer 112 may vibrate. The first vibration device 11 may transfer the periodic stress to the vibration member 90, and thus, the vibration member 90 may flexurally vibrate. Accordingly, the vibration member 90 may vibrate and may generate a vibration and/or a sound based on a sound signal. The electrodes 111 and 113 and the electrodes 211 and 213 may be made of a transparent conductive material, a semitransparent conductive material, or an opaque conductive material. For example, the transparent conductive material or the semitransparent conductive material may include one or more of indium tin oxide (ITO) or indium zinc oxide (IZO), but embodiments of the present disclosure are not limited thereto. The opaque conductive material may include one or more of an aluminum (Al), a copper (Cu), a gold (Au), a silver (Ag), a molybdenum (Mo), a magnesium (Mg), or the like, or an alloy thereof, but embodiments of the present disclosure are not limited thereto.

In the embodiment of the present disclosure, in addition to the first vibration device 11, the second vibration device 21 may be connected to the vibration member 90. Accordingly, the vibration generated in the vibration layer 212 may be transferred to the vibration member 90 through the second elastic member 33. Therefore, since an amplitude of a bending vibration (or flexurally vibration) of the vibration member 90 may be increased, an output of a low sound band may be enhanced.

Figure 7:
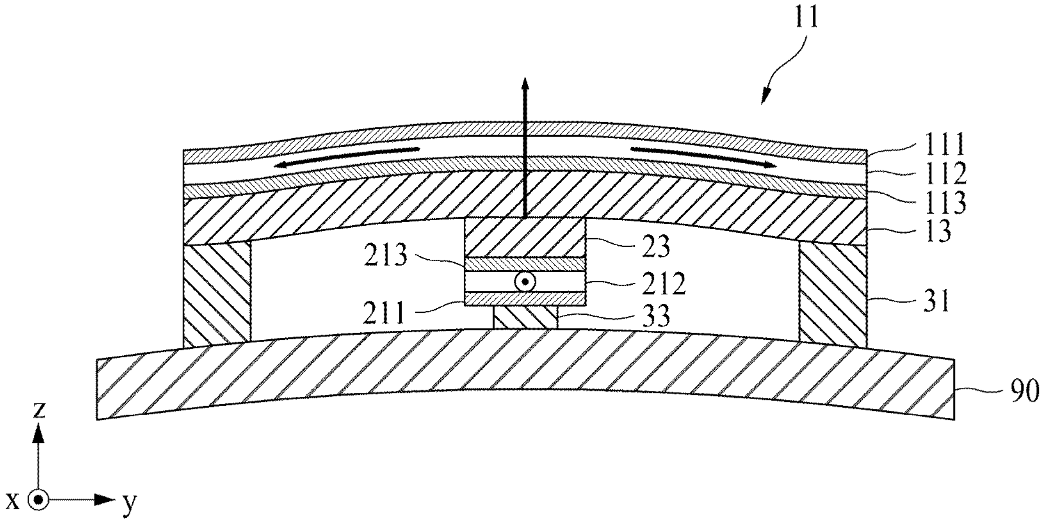
FIG. 7 is schematic diagrams illustrating deformation when a voltage is applied to the sound apparatus according to a first embodiment of the present disclosure.
Figure 8:
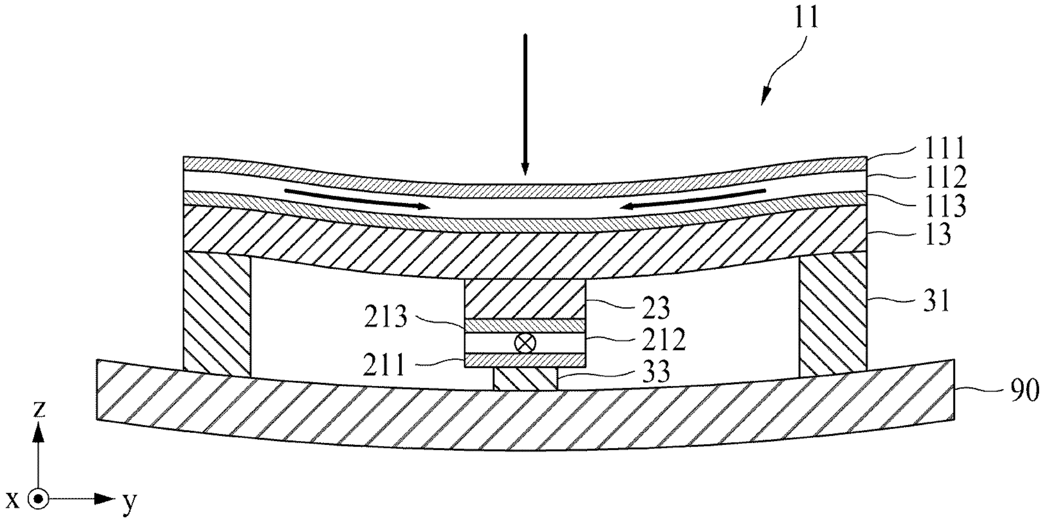
FIG. 8 is schematic diagrams illustrating deformation when a voltage is applied to the sound apparatus according to a first embodiment of the present disclosure.

The bending vibration of the vibration member 90 will be described in detail with reference to FIGS. 7 and 8. FIGS. 7 and 8 are schematic diagrams illustrating deformation when the voltage is applied to the first vibration device 11 and the second vibration device 21 according to the first embodiment of the present disclosure. As shown in FIG. 6, the polarization direction of the vibration layer 112 may be opposite to the polarization direction of the vibration layer 212, and the applied voltage of the vibration layer 112 may be opposite to the applied voltage of the vibration layer 212. Accordingly, an expansion direction of the vibration layer 112 may be a same as an expansion direction of the vibration layer 212. For example, the first vibration device 11 and the second vibration device 21 may be displaced (or vibrated or driven) in a same direction.

As shown in FIG. 7, in the timing at which the vibration layer 112 is deformed to be expanded in a transverse direction, the vibration layer 212 may also be deformed to be expanded in the transverse direction. Thus, the end (or edge portion) of the first vibration device 11 and the end (or edge portion) of the second vibration device 21 may be bent in a direction approaching the vibration member 90. Herein, the vibration member 90 may be deformed by receiving stress directed toward the first vibration device 11 and the second vibration device 21.

As shown in FIG. 8, in the timing at which the vibration layer 112 is deformed to contract in the transverse direction, the vibration layer 212 may also be deformed to contract in the transverse direction. Thus, the end (or edge portion) of the first vibration device 11 and the end (or edge portion) of the second vibration device 21 may be bent in a direction away from the vibration member 90. Herein, the vibration member 90 may be deformed by receiving stress directed in a direction away from the first vibration device 11 and the second vibration device 21.

When an AC voltage based on a sound signal is applied to the first vibration device 11 and the second vibration device 21, the state of FIG. 7 and the state of FIG. 8 may be alternately repeated at a voice frequency. Accordingly, vibrations of the first vibration device 11 and the second vibration device 21 are transmitted to the vibration member 90, and the vibration member 90 may vibrate. Therefore, since a sound based on the driving signal is generated from the vibration member 90, the vibration member 90 may function as a speaker.

Figure 9:
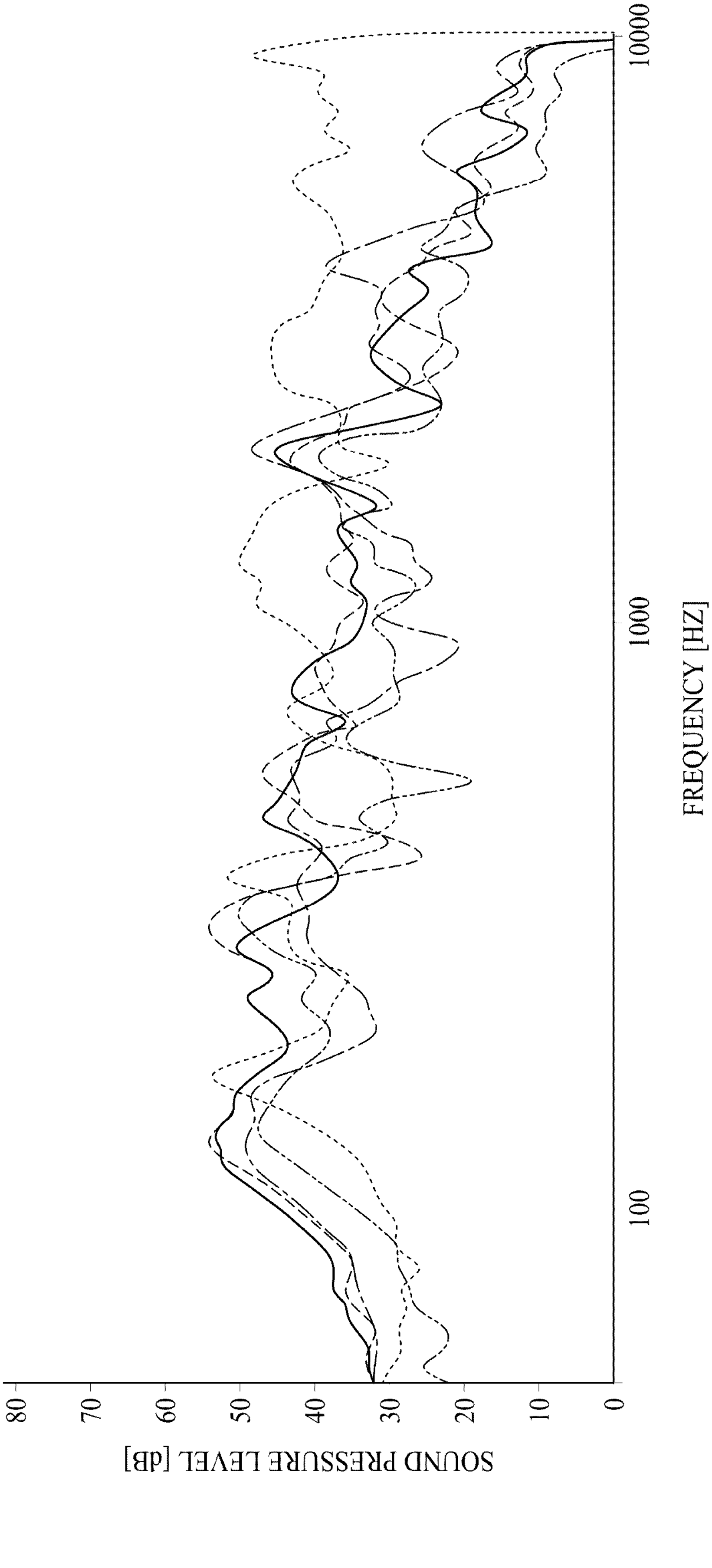
FIG. 9 is a graph showing a sound characteristic of the sound apparatus according to a first embodiment of the present disclosure.

An effect of enhancing a low-pitched sound will be described in more detail with reference to actual data. FIG. 9 is a graph illustrating the sound characteristics of the sound apparatus according to the embodiment of the present disclosure. In FIG. 9, the abscissa-axis represents a frequency (Hz) based on a log scale, and the ordinate-axis represents a sound pressure level based on a decibel (dB) unit. A curve represented by a dash-single dotted line illustrated in FIG. 9 is the sound characteristics of the sound apparatus 1 according to the embodiment of the present disclosure when a thickness in each of the first substrate 13 and the second substrate 23 is 0.1 mm. A curve represented by a solid line illustrated in FIG. 9 is the sound characteristics of the sound apparatus 1 according to the embodiment of the present disclosure when a thickness in each of the first substrate 13 and the second substrate 23 is 0.3 mm. A curve represented by a dashed line illustrated in FIG. 9 is the sound characteristics of the sound apparatus 1 according to the embodiment of the present disclosure when a thickness in each of the first substrate 13 and the second substrate 23 is 0.4 mm. A curve represented by a dash-double dotted line illustrated in FIG. 9 is the sound characteristics of the sound apparatus 1 according to the embodiment of the present disclosure when a thickness in each of the first substrate 13 and the second substrate 23 is 0.5 mm. Stainless steel may be used for the first substrate 13 and the second substrate 23. Moreover, the curve represented by a dotted line illustrated in FIG. 9 is the sound characteristics of the sound apparatus according to an experimental example except for the first substrate 13 and the second substrate 23 from the configuration according to the present embodiment.

In FIG. 9, as compared to the curve around 100 Hz to 300 Hz, in case of the configuration according to the embodiment of the present disclosure, it shows that the sound pressure with respect to the experimental example increases in any substrate thickness. Particularly, when the substrate thickness is 0.3 mm, the highest sound pressure is obtained in the vicinity of 70 Hz to 100 Hz. Also, in case of the experimental example, even though any substrate thickness is used, the sound pressure of middle-pitched sound and high-pitched sound, which is greater than or equal to 1,000 Hz, may be reduced. In the experimental example, an energy used for generating the sound pressure of middle-pitched sound and high-pitched sound may be used for enhancement of the low-pitched sound. Also, when the thickness of the substrate is 0.3 mm, a peak-dip occurrence over 500 Hz to 1000 Hz may be suppressed, as compared to the substrate thickness of 0.1 mm, 0.4 mm, and 0.5 mm. Thus, since the first substrate 13 and the second substrate 23 are connected to the first vibration device 11 and the second vibration device 21, respectively, the sound pressure in the low-pitched sound band may be enhanced. Therefore, according to the present embodiment, it is possible to provide the sound apparatus with improved sound quality.

Moreover, in case of the sound apparatus according to the experimental example which does not have the first substrate 13 and the second substrate 23, a crack is generated in the device due to the increase of curvature of the first vibration device 11 and the second vibration device 21 when the applied voltage is increased to a predetermined level or higher in order to increase the sound pressure, whereby a sound performance may be remarkably degraded. Since the sound apparatus 1 according to the present embodiment includes the first substrate 13 and the second substrate 23, a strength of the first vibration device 11 and the second vibration device 21 may be increased, thereby suppressing generation of cracks. Therefore, according to the present embodiment, the sound apparatus with improved sound quality may be provided even when a high sound pressure is used by a large signal input.

Modification Embodiment

Hereinafter, a modification example of the first embodiment of the present disclosure will be described. Herein, components other than the first vibration device 11, the first substrate 13, the second vibration device 21, and the second substrate 23 are a same as those of the first embodiment of the present disclosure.

Figure 10:
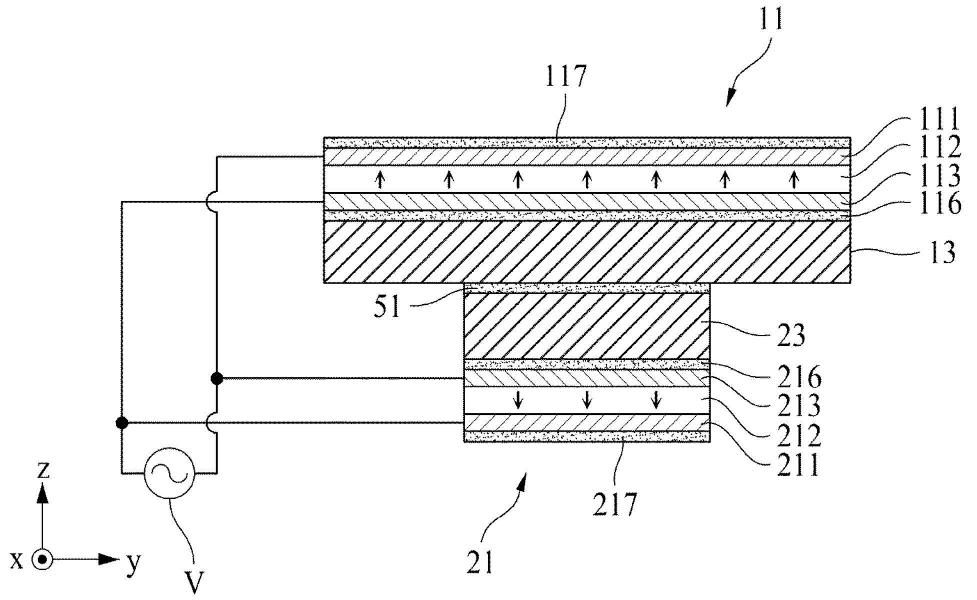
FIG. 10 is a cross-sectional view illustrating a configuration of a modification embodiment of a sound apparatus according to a first embodiment of the present disclosure in more detail.

FIG. 10 is a cross-sectional view illustrating a configuration of a sound apparatus according to the modification embodiment of the present disclosure. In a same manner as FIGS. 4 and 6, FIG. 10 is a cross-sectional view taken along line A-A' of FIG. 3. In the modification embodiment of the present disclosure, a length of a first substrate 13 in the y-axis direction may be a same as a length of a first vibration device 11 in the y-axis direction, but embodiments of the present disclosure are not limited thereto. For example, the length of the first substrate 13 in the y-axis direction may be longer or even shorter than the length in the y-axis direction of the first vibration device 11. According as the first substrate 13 is configured in this structure, it is possible to suppress an occurrence of harmonics from the end (or edge portion) of the first substrate 13 which is not overlapped with the first vibration device 11. Similarly, a length of a second substrate 23 in the x-axis direction may be a same as a length of a second vibration device 21 in the x-axis direction, but embodiments of the present disclosure are not limited thereto. For example, the length of the second substrate 23 in the x-axis direction may be longer or even shorter than the length of the second vibration device 21 in the x-axis direction. According as the second substrate 23 is configured in this structure, it is possible to suppress an occurrence of harmonics with high efficiency. Thus, according to the modification embodiment of the present disclosure, it is possible to provide a sound apparatus with more improved sound quality. As an example, a length of a first substrate 13 in the x-axis direction may be a same as a length of a first vibration device 11 in the x-axis direction, or may be longer or even shorter than the length of a first vibration device 11 in the x-axis direction. Similarly, a length of a second substrate 23 in the y-axis direction may be a same as a length of a second vibration device 21 in the y-axis direction, or may be longer or even shorter than the length of a second vibration device 21 in the y-axis direction.

Figure 11:
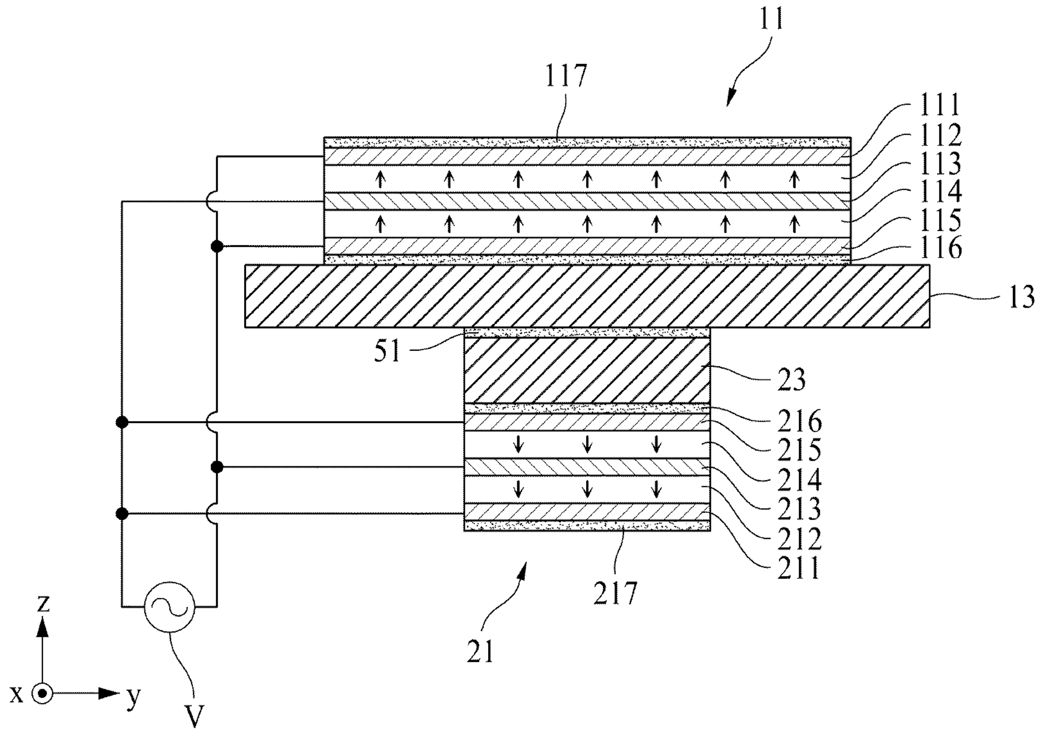
FIG. 11 is a cross-sectional view illustrating a configuration of a modification embodiment of a sound apparatus according to a first embodiment of the present disclosure in more detail.

FIG. 11 is a cross-sectional view illustrating a configuration of a sound apparatus according to another modification embodiment of the present disclosure. In a same manner as FIGS. 4 and 6, FIG. 11 is a cross-sectional view taken along line A-A' of FIG. 3. In the modification embodiment of the present disclosure, a device structure in each of a first vibration device 11 and a second vibration device 21 may include a bimorph structure. For example, the first vibration device 11 may include an electrode (or first electrode) 111, a vibration layer (or first vibration layer) 112, an electrode (or second electrode) 113, a vibration layer (or second vibration layer) 114, an electrode (or third electrode) 115, an adhesive layer 116, and a protection layer 117. A polarization direction of the vibration layers 112 and 114 may be a forward direction or sub-direction of the z-axis. The electrode 113 may be disposed between the vibration layer 112 and the vibration layer 114. The second vibration device 21 may include an electrode (or first electrode) 211, a vibration layer (or first vibration layer) 212, an electrode (or second electrode) 213, a vibration layer (or second vibration layer) 214, an electrode (or third electrode) 215, an adhesive layer 216, and a protection layer 217. A polarization direction of the vibration layers 212 and 214 may be the sub-direction or forward direction of the z-axis. The electrode 213 may be disposed between the vibration layer 212 and the vibration layer 214. Herein, one terminal of an AC power source V may be connected to the electrode 111, the electrode 115, and the electrode 213, and the other terminal thereof may be connected to the electrode 113, the electrode 211, and the electrode 215, but embodiments of the present disclosure are not limited thereto. According as the bimorph structure is included, it is possible to improve a conversion efficiency of voltage and displacement. Also, the first vibration device 11 and the second vibration device 21 are connected to the first substrate 13 and the second substrate 23, respectively. Thus, even if the displacement of the vibration device increases due to the bimorph structure, it is possible to suppress a generation of crack in the vibration device. Therefore, according to the modification embodiment of the present disclosure, a sound device with improved sound quality may be provided without damaging the vibration device even when a high sound pressure is used.

Figure 12:
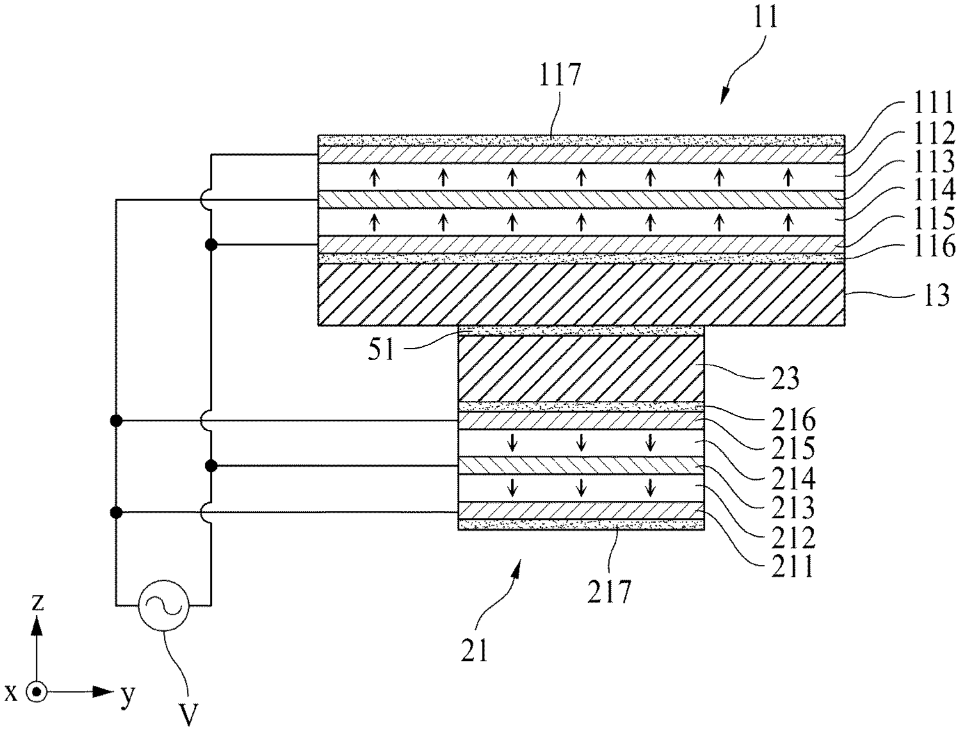
FIG. 12 is a cross-sectional view illustrating a configuration of a modification embodiment of a sound apparatus according to a first embodiment of the present disclosure in more detail.

FIG. 12 is a cross-sectional view illustrating a configuration of a sound apparatus according to another modification embodiment of the present disclosure. In a same manner as in FIGS. 4 and 6, FIG. 12 is a cross-sectional view taken along line A-A' of FIG. 3. In the modification embodiment of the present disclosure, a length of a first substrate 13 in the y-axis direction may be a same as a length of a first vibration device 11 in the y-axis direction, but embodiments of the present disclosure are not limited thereto. For example, the length of the first substrate 13 in the y-axis direction may be longer or even shorter than the length in the y-axis direction of the first vibration device 11. Also, in a same manner as FIG. 11, a device structure of the first vibration device 11 and the second vibration device 21 may include a bimorph structure. Therefore, according to the modification embodiment of the present disclosure, even when a high sound pressure is used, an occurrence of harmonics is effectively suppressed without damages on the vibration device, thereby providing a sound apparatus with improved sound quality.

Second Embodiment

In present embodiment, a modification example of the structure of the sound apparatus 1 according to the first embodiment of the present disclosure will be described. A first vibration device 11, a second vibration device 21, a first substrate 13, a second substrate 23, and a vibration member 90 are identical in structure to those of the first embodiment of the present disclosure, and thus, repeated descriptions are omitted or briefly given.

Figure 13:
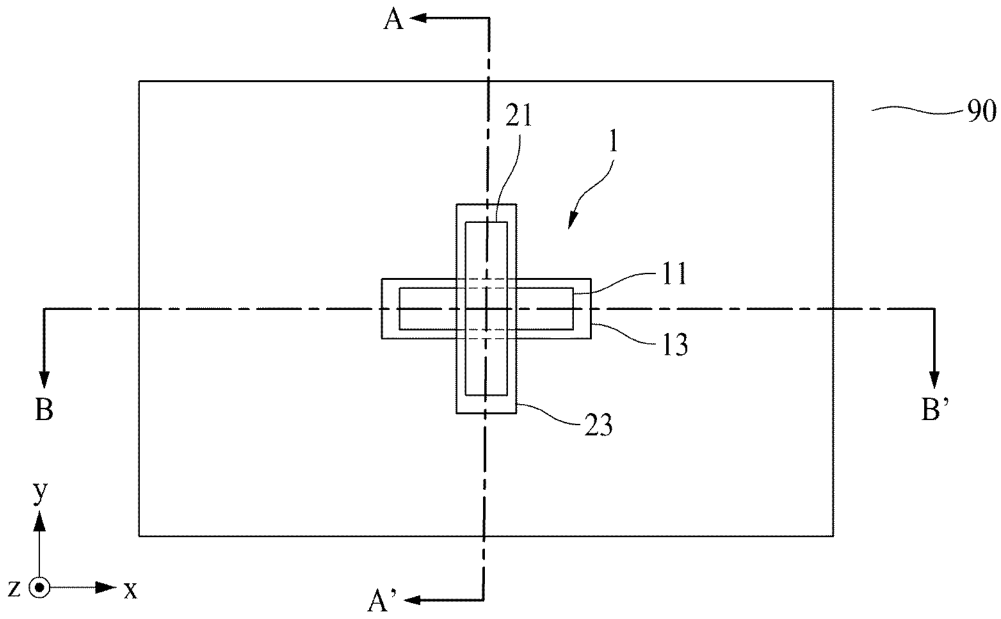
FIG. 13 is a plan view illustrating a configuration of a sound apparatus according to a second embodiment of the present disclosure.
Figure 14:
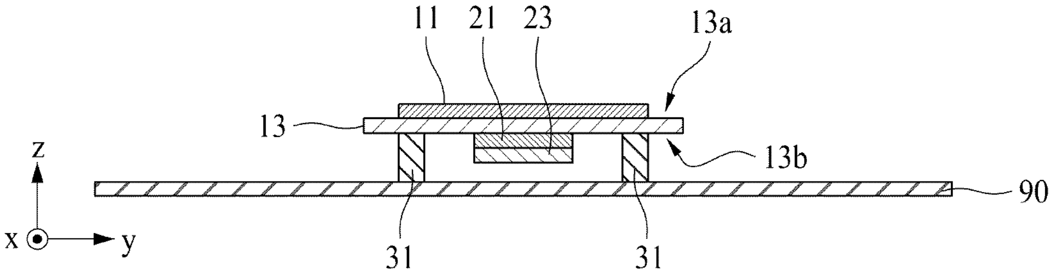
FIG. 14 is a cross-sectional view illustrating a configuration of a sound apparatus according to a second embodiment of the present disclosure.
Figure 15:
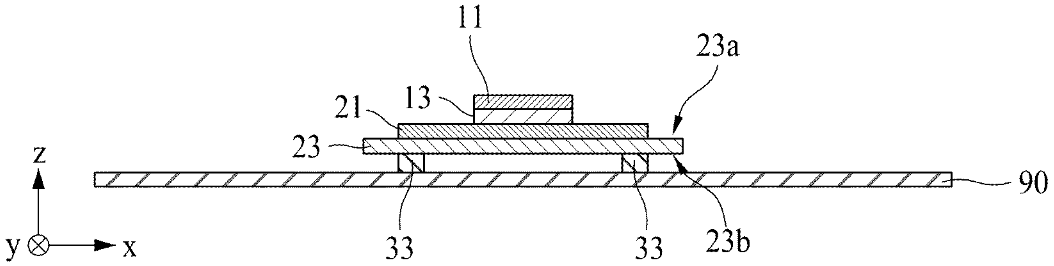
FIG. 15 is cross-sectional views illustrating a configuration of a sound apparatus according to a second embodiment of the present disclosure.
Figure 16:
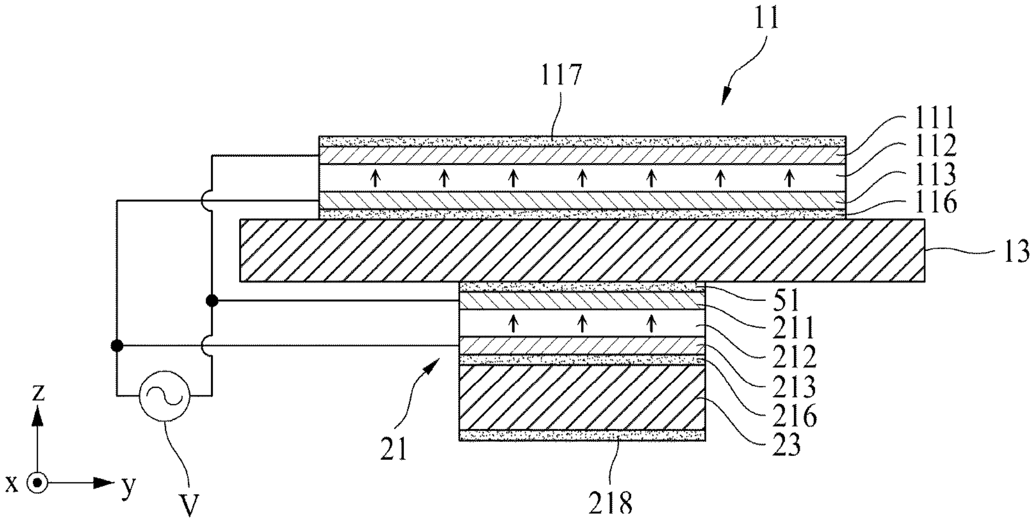
FIG. 16 is a cross-sectional view illustrating a structure of a sound apparatus according to a second embodiment of the present disclosure in more detail.

FIG. 13 is a plan view illustrating a configuration of a sound apparatus according to the second embodiment of the present disclosure. FIGS. 14 and 15 are cross-sectional views illustrating a configuration of a sound apparatus according to the second embodiment of the present disclosure. FIG. 16 is a cross-sectional view illustrating a structure of a vibration device according to the second embodiment of the present disclosure. FIGS. 14 and 16 are cross-sectional views taken along line A-A' of FIG. 13. FIG. 15 is a cross-sectional view taken along line A-A' of FIG. 13. A detailed configuration of the sound apparatus 1 according to the second embodiment of the present disclosure will be described with reference to FIGS. 13 to 16.

As shown in FIG. 13, the sound apparatus 1 may include a first vibration device 11, a first substrate 13, a second vibration device 21, a second substrate 23, a first elastic member 31, a second elastic member 33, and a vibration member 90. When seen in a plane, the first substrate 13 and the second substrate 23 may have a rectangular flat plate shape, without being limited thereto. In FIGS. 13 to 16, a coordinate-axis is illustrated where directions of two sides of the vibration device 11 are the x-axis and the y-axis, and a direction perpendicular to the x-axis and the y-axis is the z-axis. A first substrate 13 may include two main surfaces **13*a* and 13*b* facing each other. Moreover, a second substrate 23 may include two main surfaces 23*a* and 23*b*** facing each other.

The first substrate 13 may be connected to the first vibration device 11. A first main surface **13*a* of the first substrate 13 may be connected to the first vibration device 11. As shown in FIG. 14, in the present embodiment, a portion of the first main surface 13*a* of the first substrate 13 may be connected to the first vibration device 11. However, as described below, the entire surface of the first main surface 13*a* of the first substrate 13 may be configured to be connected to the first vibration device 11**.

The first substrate 13 may be further connected to a second vibration device 21. A second main surface **13*b* of the first substrate 13 may be connected to the second vibration device 21. As shown in FIG. 14, in the present embodiment, a portion of the second main surface 13*b* of the first substrate 13 may be connected to a portion of a main surface of one side of the second vibration device 21. Therefore, as shown in FIG. 13, when seen in a plane, the first substrate 13 and the second vibration device 21 may be disposed to intersect. For example, when seen in a plane, the first substrate 13 and the second vibration device 21** may be disposed to have a "+" shape.

The second vibration device 21 may be connected to a second substrate 23. The second vibration device 21 may be connected to a first main surface **23*a* of the second substrate 23. As shown in FIG. 15, in the present embodiment, a portion of the first main surface 23*a* of the second substrate 23 may be connected to the second vibration device 21. However, as described below, the entire surface of the first main surface 23*a* of the second substrate 23 may be configured to be connected to the second vibration device 21**.

The first substrate 13 may be connected to a vibration member 90 through a plurality of first elastic members 31. The second main surface **13*b* of the first substrate 13 may be connected to the vibration member 90 through at least two first elastic members 31. While suppressing generation of harmonics, when seen in a plane, the first elastic member 31 may be disposed within an area in which a first vibration device 11 and the first substrate 13 overlap, but embodiments of present disclosure are not limited thereto. Particularly, as shown in FIG. 14, an exposed outer surface of the end (or edge portion) of the first elastic member 31 may be arranged to correspond to the surface in the end (or edge portion) of the long side direction of the first vibration device 11, but embodiments of present disclosure are not limited thereto. In this case, when seen in a plane, one end of the first elastic member 31 may be disposed at a position corresponding to the end in the long side direction of the first vibration device 11 in the area where the first vibration device 11 and the first substrate 13 overlap. Embodiments are not limited thereto. As an example, one end of the first elastic member 31 may be disposed at a position outer than or inner than the end in the long side direction of the first vibration device 11**.

The second substrate 23 may be connected to the vibration member 90 through a plurality of second elastic members 33. The second main surface 23*b* of the second substrate 23 may be connected to the vibration member 90 through at least two second elastic members 33. while suppressing generation of harmonics, when seen in a plane, the second elastic member 33 may be disposed within an area in which a second vibration device 21 and the second substrate 23 overlap, but embodiments of present disclosure are not limited thereto. Particularly, as shown in FIG. 15, an exposed outer surface of the end (or edge portion) of the second elastic member 33 may be arranged to correspond to the surface in the end (or edge portion) of the long side direction of the second vibration device 21, but embodiments of present disclosure are not limited thereto. In this case, when seen in a plane, one end of the second elastic member 33 may be disposed at a position corresponding to the end in the long side direction of the second vibration device 21 within the area where the second vibration device 21 and the second substrate 23 overlap. Embodiments are not limited thereto. As an example, one end of the second elastic member 33 may be disposed at a position outer than or inner than the end in the long side direction of the second vibration device 21.

An example of the structure of the sound apparatus 1 will be described in more detail with reference to FIG. 16. FIG. 16 is an enlarged view of the first vibration device 11, the first substrate 13, the second vibration device 21, and the second substrate 23 in a same section as that of FIG. 14. Also, in FIG. 6, a connection relationship of each electrode included in the first vibration device 11 and the second vibration device 21 is schematically illustrates by a circuit diagram to describe a method for inputting a driving signal to the vibration device 11.

The first vibration device 11 may comprise an electrode 111, a vibration layer 112, an electrode 113, an adhesive layer 116, and a protection layer 117. The electrode 111 and the electrode 113 may be disposed with the vibration layer 112 interposed in-between at a thickness direction and may be configured to apply a voltage to the vibration layer 112. The adhesive layer 116 may be a layer for connecting the first vibration device 11 to the first main surface 13*a* of the first substrate 13. The protection layer (or protective member) 117 may be configured to protect and insulate an upper surface of the electrode 111. For example, the protection layer 117 may be omitted. In the present embodiment, a polarization direction of the vibration layer 112 may be a forward direction or sub-direction of the z-axis, as shown in FIG. 16, without being limited thereto.

The second vibration device 21 may include an electrode 211, a vibration layer 212, an electrode 213, an adhesive layer 216, and a protection layer 218. The electrode 211 and the electrode 213 may be disposed with the vibration layer 212 interposed in-between at a thickness direction and may be configured to apply a voltage to the vibration layer 212. The adhesive layer 216 may be a layer for connecting the second vibration device 21 to the first main surface 23*a* of the second substrate 23. The protection layer 218 may be configured to protect and insulate an upper surface of the second substrate 23. For example, the protection layer 218 may be omitted. In the present embodiment, a polarization direction of the vibration layer 212 may be the forward direction or sub-direction of the z-axis, as shown in FIG. 16, without being limited thereto. A portion of the second main surface 13*b* of the first substrate 13 may be attached on a portion of the main surface of one side of the second vibration device 21 through an adhesive layer 51. In the present embodiment, since the adhesive layer 51 serves as a protection layer, a configuration corresponding to the protection layer 217 illustrated in FIG. 6 is omitted. However, in addition to the adhesive layer 51, the protection layer 217 may be disposed between the adhesive layer 51 and the second vibration device 21.

A voltage applied to the vibration device 11 and the vibration device 21 may be based on the sound signal, and thus, may be an AC voltage corresponding to a frequency of a sound which is to be generated. In FIG. 16, an alternating current (AC) voltage may be represented by a circuit sign of an AC power source V. One terminal of the AC power source V may be connected to the electrode 111 and the electrode 211, and the other terminal of the AC power source V may be connected to the electrode 113 and the electrode 213.

As shown in FIG. 16, the polarization direction of the vibration layer 112 is a same as the polarization direction of the vibration layer 212, and the applied voltage of the vibration layer 112 may be identical in direction to the applied voltage of the vibration layer 214. Accordingly, an expansion direction of the vibration layer 112 may be identical to an expansion direction of the vibration layer 212. In the present embodiment, since the first substrate 13 and the second substrate 23 are connected to the first vibration device 11 and the second vibration device 21, respectively, the sound pressure in the low-pitched sound band may be enhanced, in a same manner as the characteristics shown in FIG. 9. Therefore, according to the present embodiment, it is possible to provide the sound apparatus with improved sound quality.

Moreover, in case of the sound apparatus according to the experimental example which does not have the first substrate 13 and the second substrate 23, a crack is generated in the device due to the increase of curvature of the first vibration device 11 and the second vibration device 21 when the applied voltage is increased to a predetermined level or higher in order to increase the sound pressure, whereby a sound performance may be remarkably degraded. According to the present embodiment, the sound apparatus 1 includes the first substrate 13 and the second substrate 23, and thus, a strength of the first vibration device 11 and the second vibration device 21 may be increased, thereby suppressing generation of cracks. Therefore, according to the present embodiment, the sound apparatus with improved sound quality may be provided even when a high sound pressure is used by a large signal input.

Modification of the Second Embodiment

Hereinafter, a modification example of the second embodiment of the present disclosure will be described. Herein, components other than the first vibration device 11, the first substrate 13, the second vibration device 21, and the second substrate 23 are a same as those of the first embodiment of the present disclosure.

Figure 17:
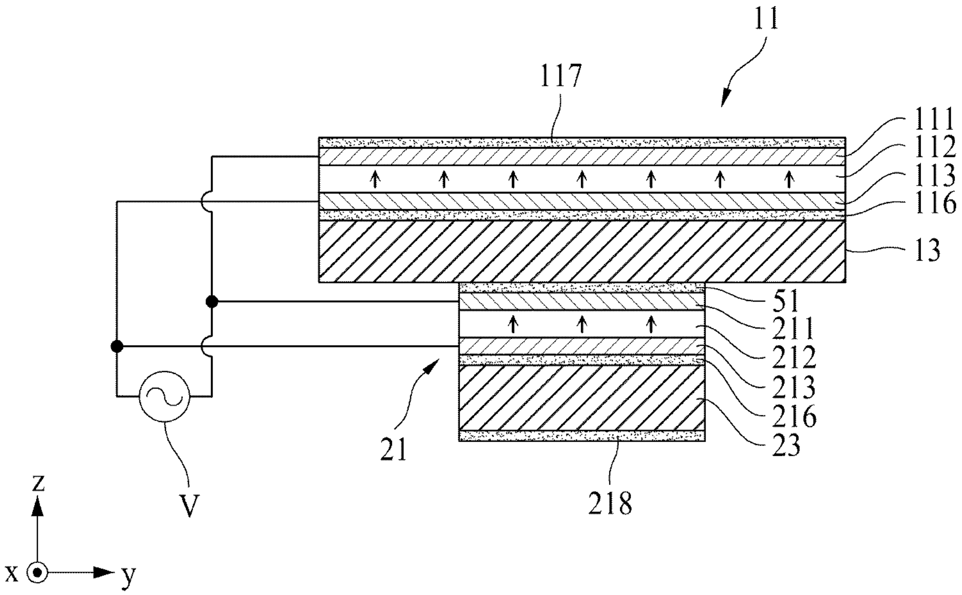
FIG. 17 is a cross-sectional view illustrating a configuration of a modification embodiment of a sound apparatus according to a second embodiment of the present disclosure in more detail.

FIG. 17 is a cross-sectional view illustrating a configuration of a sound apparatus according to the modification embodiment of the present disclosure. In a same manner as FIGS. 14 and 16, FIG. 17 is a cross-sectional view taken along line A-A' of FIG. 13. In the present modification embodiment, a length of a first substrate 13 in the y-axis direction may be a same as a length of a first vibration device 11 in the y-axis direction, but embodiments of the present disclosure are not limited thereto. For example, the length of the first substrate 13 in the y-axis direction may be longer or even shorter than the length in the y-axis direction of the first vibration device 11. According as the first substrate 13 is configured in this structure, when seen in a plane in a same manner as the modification embodiment illustrated in FIG. 10, it is possible to suppress an occurrence of harmonics from the end (or edge portion) of the first substrate 13 which is not overlapped with the first vibration device 11. Similarly, a length of a second substrate 23 in the x-axis direction may be a same as a length of a second vibration device 21 in the x-axis direction, but embodiments of the present disclosure are not limited thereto. For example, the length of the second substrate 23 in the x-axis direction may be longer than the length of the second vibration device 21 in the x-axis direction. According as the second substrate 23 is configured in this structure, it is possible to suppress an occurrence of harmonics with high efficiency. Thus, according to the present modification embodiment, it is possible to provide a sound apparatus with more improved sound quality.

Figure 18:
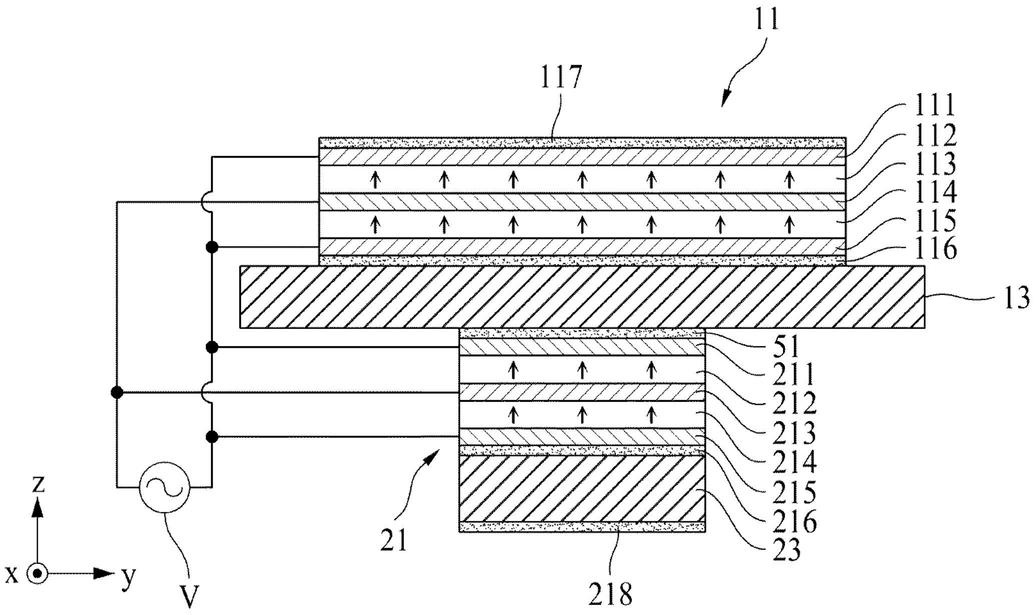
FIG. 18 is a cross-sectional view illustrating a configuration of a modification embodiment of a sound apparatus according to a second embodiment of the present disclosure in more detail.

FIG. 18 is a cross-sectional view illustrating a configuration of a sound apparatus according to another modification embodiment of the present disclosure. In a same manner as FIGS. 14 and 16, FIG. 18 is a cross-sectional view along A-A' of FIG. 13. In the present modification embodiment, a device structure of the first vibration device 11 and the second vibration device 21 may include a bimorph structure. According as the bimorph structure is included, it is possible to improve a conversion efficiency of voltage and displacement, in a same manner as the modification embodiment illustrated in FIG. 11. Also, the first vibration device 11 and the second vibration device 21 are connected to the first substrate 13 and the second substrate 23, respectively. Thus, even if the displacement of the vibration device increases due to the bimorph structure, it is possible to suppress a generation of crack in the vibration device. Therefore, according to the modification embodiment of the present disclosure, a sound device with improved sound quality may be provided without damaging the vibration device even when a high sound pressure is used.

Figure 19:
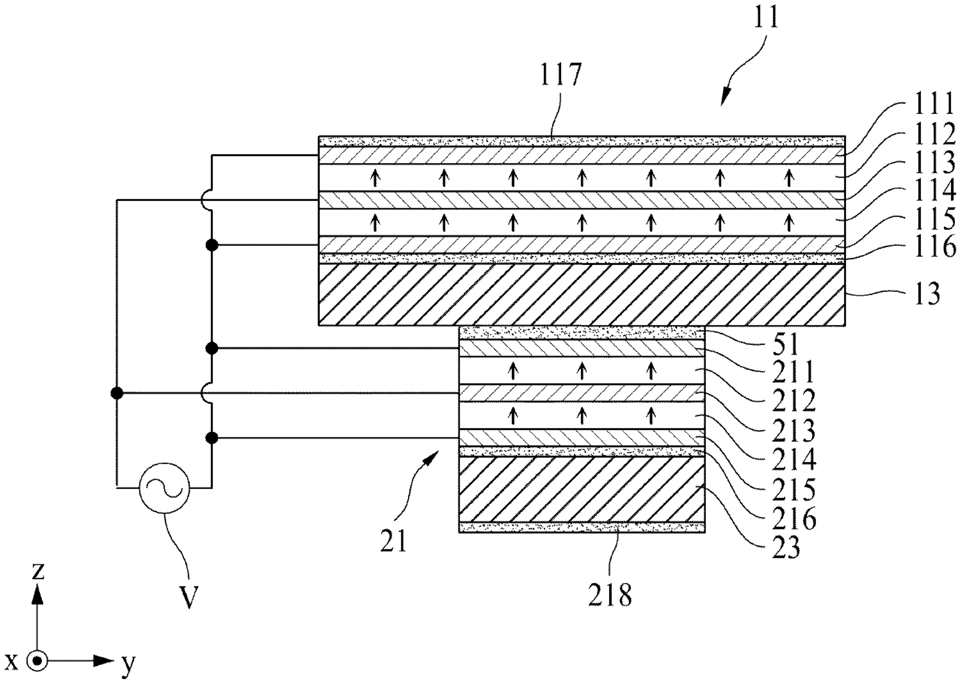
FIG. 19 is a cross-sectional view illustrating a configuration of a modification embodiment of a sound apparatus according to a second embodiment of the present disclosure in more detail.

FIG. 19 is a cross-sectional view illustrating a configuration of a sound apparatus according to another modification embodiment of the present disclosure. In the present modification embodiment, a length of a first substrate 13 in the y-axis direction may be a same as a length of a first vibration device 11 in the y-axis direction, but embodiments of the present disclosure are not limited thereto. For example, the length of the first substrate 13 in the y-axis direction may be longer or even shorter than the length in the y-axis direction of the first vibration device 11. Also, a device structure of the first vibration device 11 and the second vibration device 21 may include a bimorph structure. Therefore, according to the present modification embodiment, even when a high sound pressure is used, in a same manner as the modification embodiment illustrated in FIG. 12, an occurrence of harmonics is effectively suppressed without damages on the vibration device, thereby providing a sound apparatus with improved sound quality.

Third Embodiment

In present embodiment, a modification example of the structure of the second elastic member 33 of the sound apparatus 1 according to the first embodiment of the present disclosure will be described. A second vibration device 21 and a second substrate 23 are identical in structure to those of other embodiments of the present disclosure.

Figure 20:
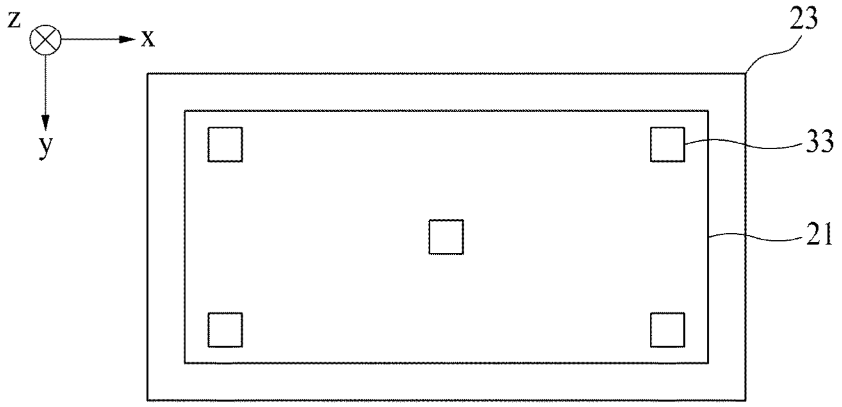
FIG. 20 is a plan view illustrating a configuration of a sound apparatus according to a third embodiment of the present disclosure.
Figure 21:
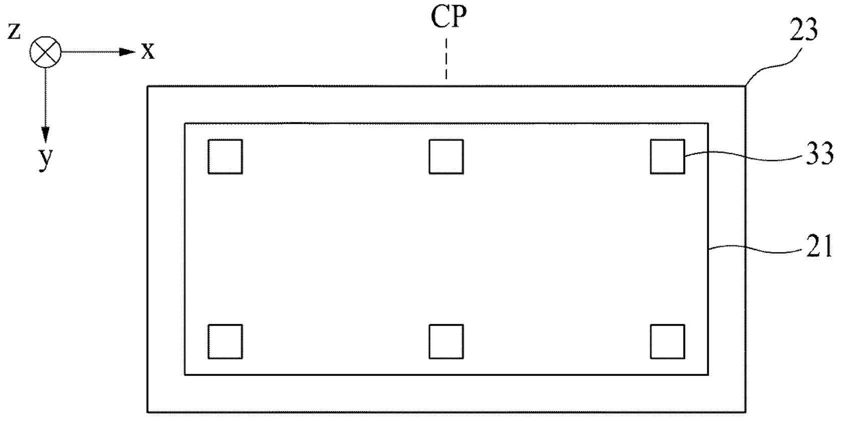
FIG. 21 is a plan view illustrating a configuration of a sound apparatus according to a third embodiment of the present disclosure.
Figure 22:
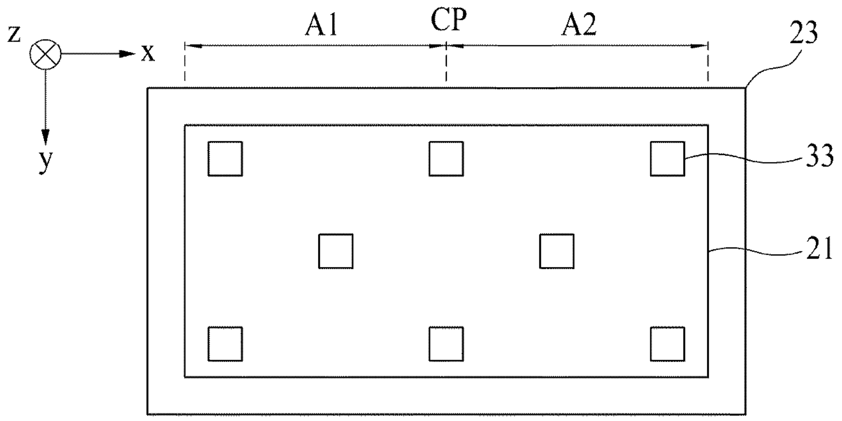
FIG. 22 is a plan view illustrating a configuration of a sound apparatus according to a third embodiment of the present disclosure.
Figure 23:
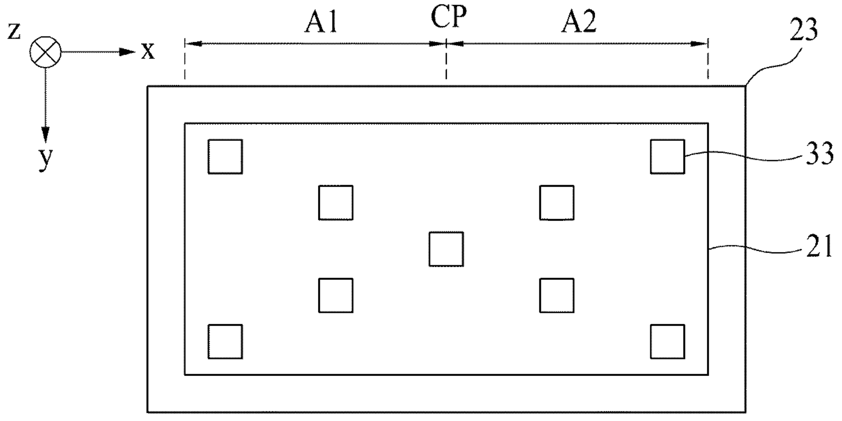
FIG. 23 is a plan view illustrating a configuration of a sound apparatus according to a third embodiment of the present disclosure.

FIGS. 20 to 23 are plan views illustrating an example of a configuration of a sound apparatus according to the third embodiment of the present disclosure. In the first embodiment of the present disclosure, the sound apparatus 1 is configured with the two second elastic members 33. In the present embodiment, the quantity and arrangement of the second elastic member 33 may be changed from those of the first embodiment. FIG. 20 illustrates a modification embodiment in which five second elastic members 33 are disposed under a main surface of one side of a second vibration device 21. For example, the five second elastic members 33 may be disposed at each corner portion and a central portion of the second vibration device 21, respectively. FIG. 21 illustrates a modification embodiment in which six second elastic members 33 are disposed under a main surface of one side of the second vibration device 21. For example, the six second elastic members 33 may be respectively disposed at each corner portion and each central portion CP between the two corner portions in the x-axis direction. FIG. 22 illustrates a modification embodiment in which eight second elastic members 33 are disposed under a main surface of one side of the second vibration device 21. For example, the eight second elastic members 33 may be respectively disposed at each corner portion of the second vibration device 21, each central portion CP between the two corner portions in the x-axis direction, and each central portion in each of two areas A1 and A2 of the second vibration device 21. FIG. 23 illustrates a modification embodiment in which nine second elastic members 33 are disposed under a main surface of one side of the second vibration device 21. For example, the nine second elastic members 33 may be respectively disposed at each corner portion, each central portion, and each middle portion between each corner portion and each central portion in the second vibration device 21. In one or more of FIGS. 21 to 23, the second elastic members 33 may be line-symmetrically disposed with respect to B-B' of FIG. 3.

Figure 24:
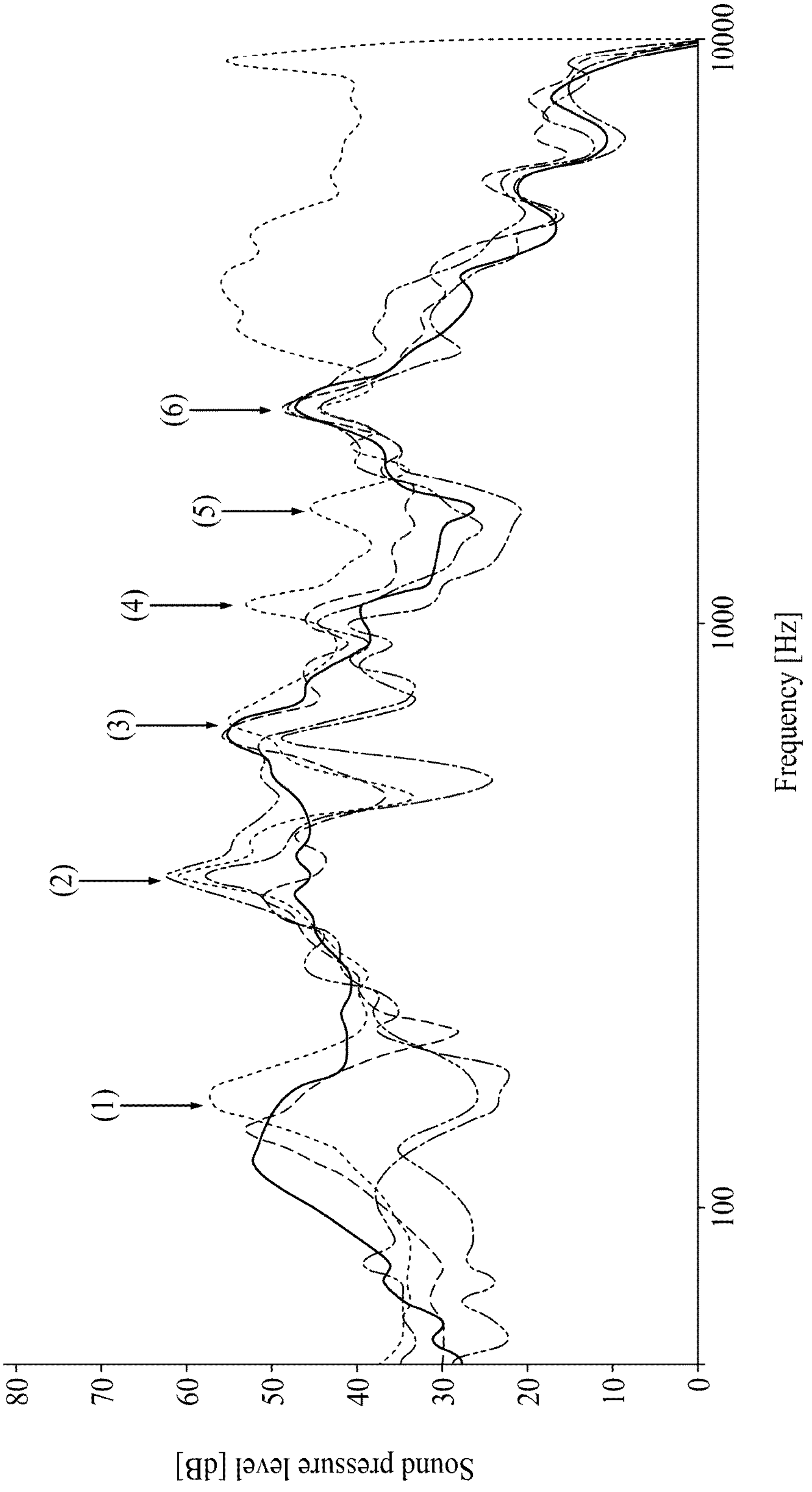
FIG. 24 is a graph showing a sound characteristic of the sound apparatus according to a third embodiment of the present disclosure.

An effect of sound characteristics according to the change in quantity and arrangement of the second elastic member 33 will be described in more detail with reference to actual data. FIG. 24 is a graph showing a sound characteristic of the sound apparatus according to the present embodiment. In FIG. 24, the abscissa-axis represents a frequency (Hz) based on a log scale, and the ordinate-axis represents a sound pressure level based on a decibel (dB) unit. A curve represented by a dash-single dotted line illustrated in FIG. 24 is the sound characteristic of the sound apparatus 1 in which the five second elastic members 33 shown in FIG. 20 are disposed. A curve represented by a solid line illustrated in FIG. 24 is the sound characteristic of the sound apparatus 1 in which the six second elastic members 33 shown in FIG. 21 are disposed. A curve represented by a dashed line illustrated in FIG. 24 is the sound characteristic of the sound apparatus 1 in which the eight second elastic members 33 shown in FIG. 22 are disposed. A curve represented by a dash-double dotted line illustrated in FIG. 24 is the sound characteristic of the sound apparatus 1 in which the nine second elastic members 33 illustrated in FIG. 23 are disposed. A stainless steel having a thickness of 0.3 mm may be used for the second substrate 23. Moreover, the curve represented by a dotted line illustrated in FIG. 24 is the sound characteristics of the sound apparatus according to an experimental example except for the first substrate 13 and the second substrate 23 from the configuration according to the present embodiment.

In the configuration of FIGS. 21 and 22 in which the second elastic member 33 is not disposed in the central portion of the second vibration device 21, a peak 1 of low-pitched range illustrated in FIG. 24 is shifted to a low frequency side as compared to an experimental example, with respect to the curve around 100 Hz to 300 Hz in FIG. 24. Particularly, it is possible to obtain the largest sound pressure by the configuration illustrated in FIG. 21, as compared to other configurations in a low sound band around 100 Hz. For the experimental example in one or more of FIGS. 20 to 23, it may be seen that a peak-dip 2, 4 and 5 of middle-pitched and high-pitched sound band illustrated in FIG. 24 is reduced. Especially, in case of the configuration of FIGS. 21 and 22 in which the second elastic member 33 is not disposed in the central portion of the second vibration device 21, the peak-dip 2 may be significantly reduced. In addition, even in the configuration of one or more of FIGS. 20 to 23, a high-pitched sound band may be significantly reduced with respect to the experimental example. In the experimental example, it may be seen that an energy used for generating the sound pressure of middle-pitched and high-pitched sound band is used for increasing the low-pitched sound band. As illustrated in the present embodiment, it is possible to increase the sound pressure of the low-pitched sound band by changing the quantity and arrangement of the second elastic member 33, thereby flattening the peak-dip. Therefore, according to the present embodiment, a sound apparatus with more improved sound quality may be provided.

Fourth Embodiment

In present embodiment, a modification example of the structure of the sound apparatus 1 according to the fourth embodiment of the present disclosure will be described.

Figure 25:
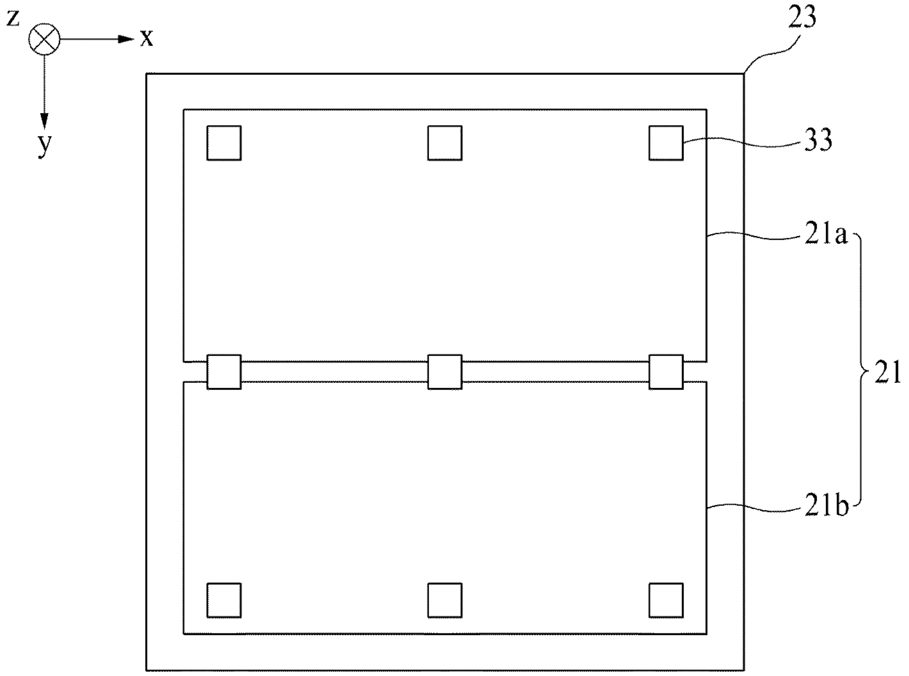
FIG. 25 is a plan view illustrating a configuration of a sound apparatus according to a fourth embodiment of the present disclosure.
Figure 26:
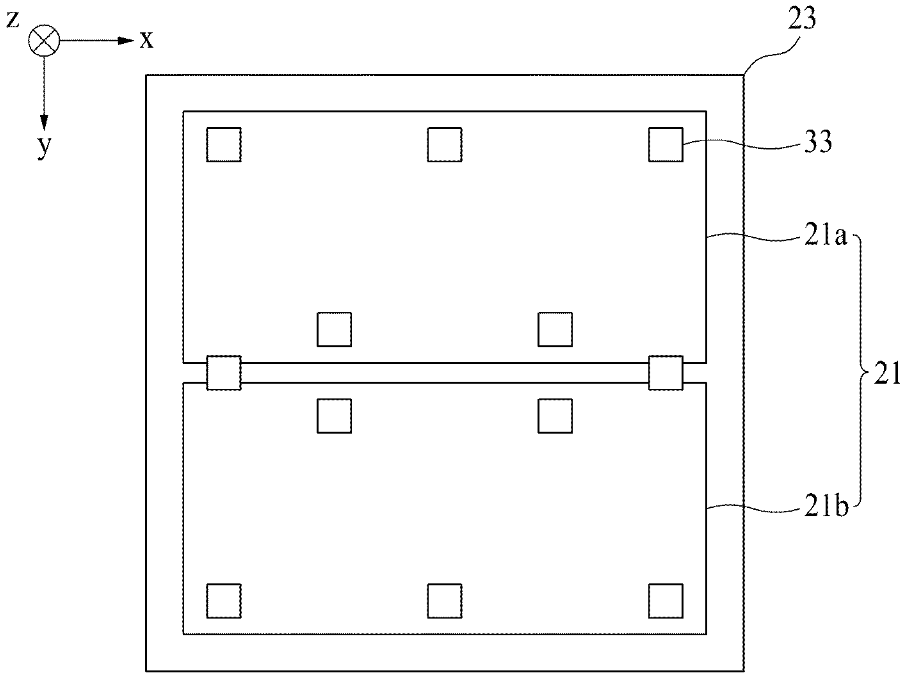
FIG. 26 is a plan view illustrating a configuration of a sound apparatus according to a fourth embodiment of the present disclosure.
Figure 27:
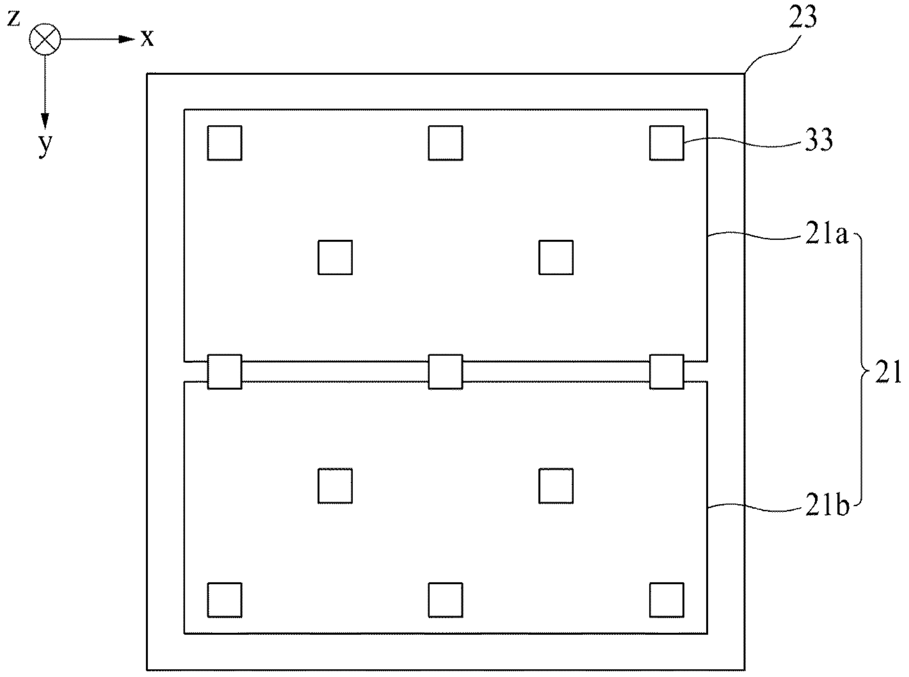
FIG. 27 is a plan view illustrating a configuration of a sound apparatus according to a fourth embodiment of the present disclosure.

FIGS. 25 to 27 are a plan view illustrating a configuration of a sound apparatus according to the present embodiment. The sound apparatus 1 according to the third embodiment of the present disclosure may comprise the second elastic member 33 disposed under one second vibration device 21. A sound apparatus 1 according to the present embodiment may comprise two second vibration devices 21*a* and 21*b* arranged in parallel under a second main surface 23*b* of a second substrate 23, and a second elastic member 33 disposed under the two second vibration devices 21*a* and 21*b*. FIG. 25 illustrates a modification embodiment in which nine second elastic members 33 are disposed under each main surface of the second vibration devices 21*a* and 21*b*. FIG. 26 illustrates a modification embodiment in which twelve second elastic members 33 are disposed under each main surface of the second vibration devices 21*a* and 21*b*. FIG. 27 illustrates a modification embodiment in which thirteen second elastic members 33 are disposed under each main surface of the second vibration devices 21*a* and 21*b*. In one or more of FIGS. 25 to 27, the second elastic members 33 may be line-symmetrically disposed with respect to B-B' of FIG. 3.

Figure 28:
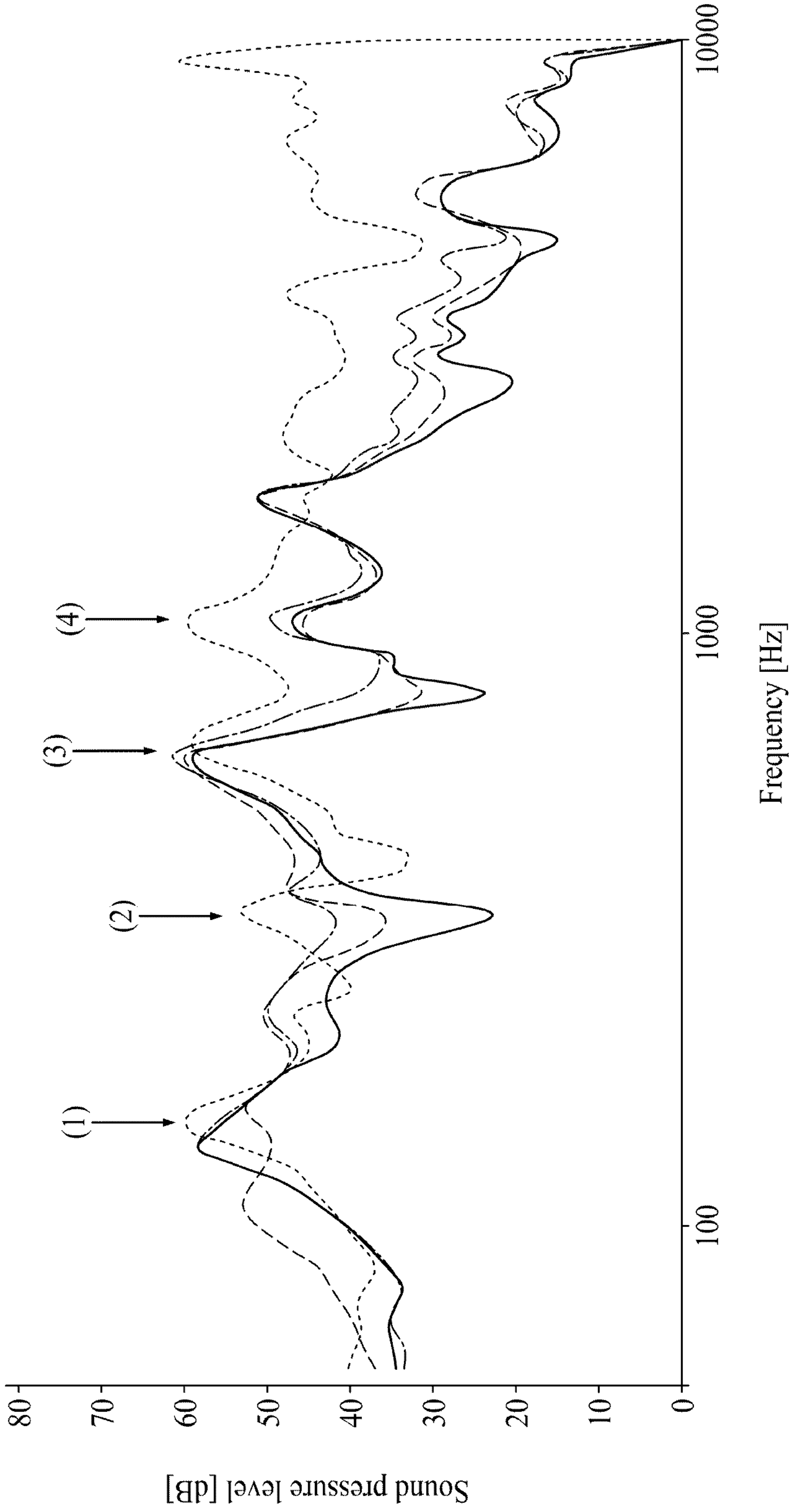
FIG. 28 is a graph showing a sound characteristic of the sound apparatus according to a fourth embodiment of the present disclosure.

An effect of sound characteristics according to the change in quantity and arrangement of the second vibration device 21 and the second elastic member 33 will be described in more detail with reference to actual data. FIG. 28 is a graph showing a sound characteristic of the sound apparatus according to the present embodiment. In FIG. 28, the abscissa-axis represents a frequency (Hz) based on a log scale, and the ordinate-axis represents a sound pressure level based on a decibel (dB) unit. A curve represented by a dash-single dotted line illustrated in FIG. 28 is the sound characteristic of the sound apparatus 1 in which the nine second elastic members 33 illustrated in FIG. 25 are disposed. A curve represented by a solid line illustrated in FIG. 28 is the sound characteristic of the sound apparatus 1 in which the twelve second elastic members 33 illustrated in FIG. 26 are disposed. A curve represented by a dashed line illustrated in FIG. 28 is the sound characteristic of the sound apparatus 1 in which the thirteen second elastic members 33 illustrated in FIG. 27 are disposed. A stainless steel having a thickness of 0.3 mm may be used for the second substrate 23. Moreover, the curve represented by a dotted line illustrated in FIG. 28 is the sound characteristics of the sound apparatus according to an experimental example except for the first substrate 13 and the second substrate 23 from the configuration according to the present embodiment.

In the configuration of FIGS. 25 and 27, a peak 1 of low-pitched range illustrated in FIG. 28 is shifted to a low frequency side as compared to an experimental example, with respect to the curve around 100 Hz to 300 Hz in FIG. 28. Particularly, it is possible to obtain the largest sound pressure by the configuration illustrated in FIG. 25, as compared to other configurations in a low sound band around 100 Hz. For the experimental example in one or more of FIGS. 25 to 27, it may be seen that a peak-dip 2 and 4 of middle-pitched sound band illustrated in FIG. 28 is reduced. Especially, even in the configuration of one or more of FIGS. 25 to 27, a high-pitched sound band may be significantly reduced with respect to the experimental example. In the experimental example, it may be seen that an energy used for generating the sound pressure of middle-pitched and high-pitched sound band is used for increasing the low-pitched sound band. As illustrated in the present embodiment, it is possible to increase the sound pressure of the low-pitched sound band by changing the quantity and arrangement of the second elastic member 33, thereby flattening the peak-dip. Therefore, according to the present embodiment, a sound apparatus with more improved sound quality may be provided.

Fifth Embodiment

In the present embodiment, a modification example of the structure of a vibration device in the sound apparatus 1 according to the fifth embodiment of the present disclosure will be described.

Figure 29:
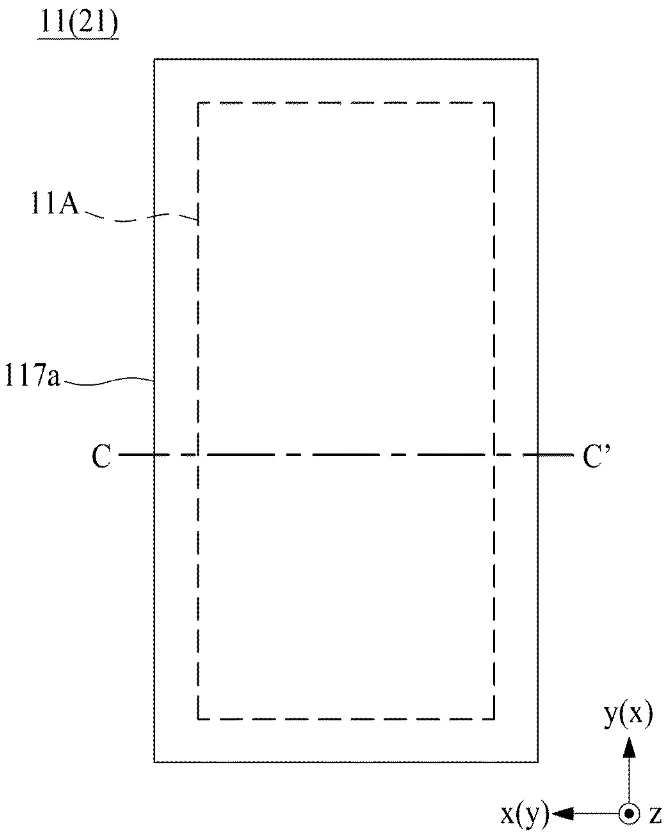
FIG. 29 is a plan view illustrating a configuration of a vibration device according to a fifth embodiment of the present disclosure.
Figure 30:
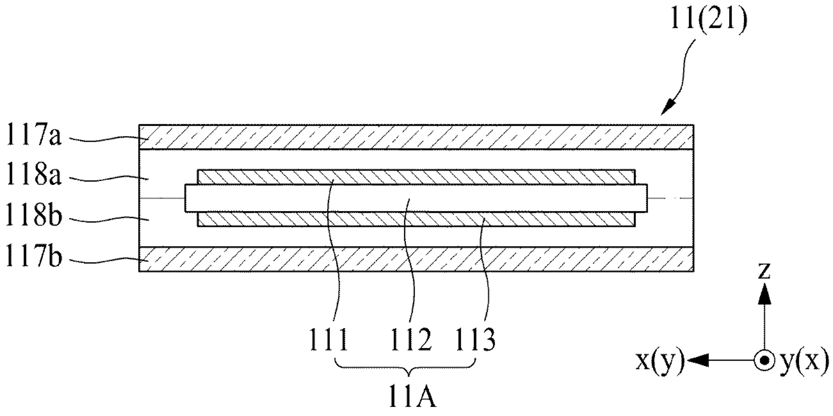
FIG. 30 is a cross-sectional view illustrating a configuration of a vibration device according to a fifth embodiment of the present disclosure.

FIG. 29 is a plan view illustrating a configuration of a vibration device in the sound apparatus according to an embodiment of the present disclosure. FIG. 30 is a cross-sectional view along C-C' of FIG. 29. As shown in FIGS. 29 and 30, each of a first vibration device 11 and a second vibration device 21 according to the fifth embodiment of the present disclosure may include a vibration generating portion (or vibration portion) 11A.

The vibration generating portion 11A may include a vibration layer 112, a first electrode 111 at a first surface of the vibration layer 112, and a second electrode 113 at a second surface different from the first surface of the vibration layer 112. The vibration layer 112 may be substantially a same as the vibration layer 112 described in FIG. 6, whereby repeated descriptions are omitted or briefly given. The first electrode 111 and the second electrode 113 may be disposed with the vibration layer 112 interposed in-between at a thickness direction, and the first electrode 111 and the second electrode 113 may apply a voltage to the vibration layer 112. A polarization direction of the vibration layer 112 may be a forward direction or a sub-direction of the z-axis. Also, wires (or lines) for applying a voltage to each electrode may be connected to the electrodes 111 and 113 by soldering or the like.

Each of the first vibration device 11 and the second vibration device 21 according to the fifth embodiment of the present disclosure may further include a first protection layer (or first protection member) 117*a* and a second protection layer (or second protection member) 117*b*. The first protection layer 117*a* may be connected to a first surface (or front surface or upper surface) of the vibration generating portion 11A. The first protection layer 117*a* may protect and insulate the first surface of the vibration generating portion 11A. The second protection layer 117*b* may be connected to a second surface (or rear surface or lower surface) of the vibration generating portion 11A. The second protection layer 117*b* may protect and insulate the second surface of the vibration generating portion 11A. For example, any one of the first protection layer 117*a* and the second protection layer 117*b* in the first vibrating device 11 may be connected to the first substrate 13 through an adhesive layer. For example, any one of the first protection layer 117*a* and the second protection layer 117*b* in the second vibrating device 21 may be connected to the second substrate 23 through an adhesive layer.

The first protection layer 117*a* may be connected or coupled to the first electrode 111 by a first adhesive layer 118*a*. The second protection layer 117*b* may be connected or coupled to the second electrode 113 by a second adhesive layer 118*b*. The first adhesive layer 118*a* and the second adhesive layer 118*b* may be configured at a region between the first protection layer 117*a* and the second protection layer 117*b* to completely surround the vibration generating portion 11A. For example, the vibration generating portion 11A may be embedded or built-in at a region between the first adhesive layer 118*a* and the second adhesive layer 118*b*. Embodiments are not limited thereto. As an example, at least a portion of the vibration generating portion 11A may be exposed from the first protection layer 117*a* and the second protection layer 117*b*.

Sixth Embodiment

In present embodiment, a modification example of the structure of a vibration layer in the sound apparatus 1 according to the fifth embodiment of the present disclosure will be described.

Figure 31:
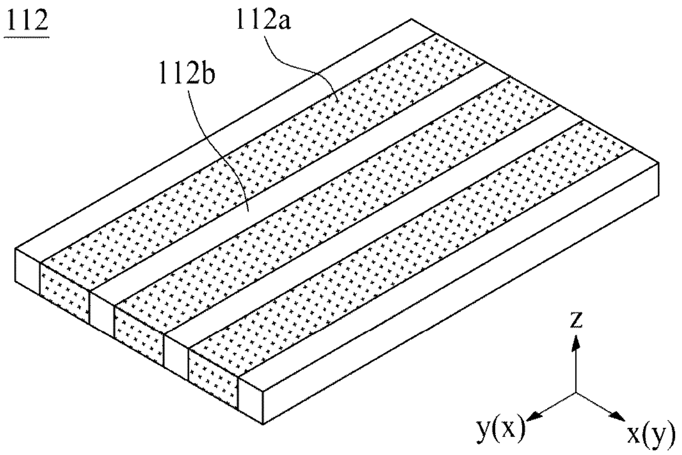
FIG. 31 is a perspective view illustrating a vibration layer of a vibration device according to a sixth embodiment of the present disclosure.

FIG. 31 is a perspective view illustrating the vibration layer in the vibration device according to the present embodiment. A vibration layer 112 of a vibration generating portion 11A of each of the vibration device 11 and the vibration device 21 according to the present embodiment may include a plurality of first portions 112*a* and one or more second portions 112*b*. For example, the vibration layer 112 may include a plurality of first portions 112*a* and a plurality of second portions 112*b* between the plurality of first portions 112*a*. For example, the plurality of first portions 112*a* and the plurality of second portions 112*b* may be alternately and repeatedly disposed along one direction (e.g., the x-axis direction, the y-axis direction or any other direction), but embodiments of the present disclosure are not limited thereto.

Each of the plurality of first portions 112*a* may include an inorganic material having a piezoelectric characteristic. For example, each of the plurality of first portions 112*a* may be an inorganic material portion or a piezoelectric material portion. Each of the plurality of first portions 112*a* may have a first width W1 parallel to the one direction (e.g., the x-axis direction) and may be extended along another direction (e.g., the y-axis direction). Each of the plurality of first portions 112*a* may be substantially a same as the vibration layer 112 described above with reference to FIG. 6, and thus, repeated descriptions are omitted or briefly given.

Each of the plurality of second portions 112*b* may be disposed at a region between the plurality of first portions 112*a*. For example, each of the plurality of first portions 112*a* may be disposed at a region between two adjacent second portions 112*b* of the plurality of second portions 112*b*. For example, the plurality of first portions 112*a* and the plurality of second portions 112*b* may include a line shape or a stripe shape which has a same size or different sizes.

Each of the plurality of second portions 112*b* may be configured to fill a gap between two adjacent first portions of the plurality of first portions 112*a*. Each of the plurality of first portions 112*a* and the plurality of second portions 112*b* may be disposed (or arranged) at a same plane (or a same layer) in parallel with each other. Each of the plurality of second portions 112*b* may absorb an impact applied to the first portions 112*a*, and thus, may enhance the durability of the first portions 112*a* and provide flexibility to the vibration device 11 and the vibration device 21. As an example, each of the plurality of second portions 112*b* may include an organic material having a ductile characteristic, without being limited thereto. For example, each of the plurality of second portions 112*b* may include one or more of an epoxy-based polymer, an acrylic-based polymer, and a silicone-based polymer, but embodiments of the present disclosure are not limited thereto. For example, each of the plurality of second portions 112*b* may be an organic portion, an organic material, an adhesive portion, a stretch portion, a bending portion, a damping portion, an elastic portion, an elasticity portion, or a ductile portion, or the like, but embodiments of the present disclosure are not limited thereto.

A first surface of each of the plurality of first portions 112*a* and the plurality of second portions 112*b* may be connected to the first electrode in common. A second surface of each of the plurality of first portions 112*a* and the plurality of second portions 112*b* may be connected to the second electrode in common.

In the vibration device 11 of the sound apparatus 1 according to the sixth embodiment of the present disclosure, the plurality of first portions 112*a* and the plurality of second portion 112*b* may be disposed on (or connected to) a same plane, and thus, the vibration layer 112 may have a single thin film-type. Accordingly, the vibration device 11 and the vibration device 21 may be vibrated in a vertical direction by the first portions 112*a* having a vibration characteristic and may be bent in a curved shape by the second portions 112*b* having flexibility. For example, the vibration device 11 and the vibration device 21 including the vibration layer 112 may have a 2-2 composite structure, and thus, may have a resonance frequency of 20 kHz or less, but embodiments of the present disclosure are not limited thereto.

Seventh Embodiment

In present embodiment, a modification example of the structure of a vibration layer in the sound apparatus 1 according to the fifth embodiment of the present disclosure will be described.

Figure 32:
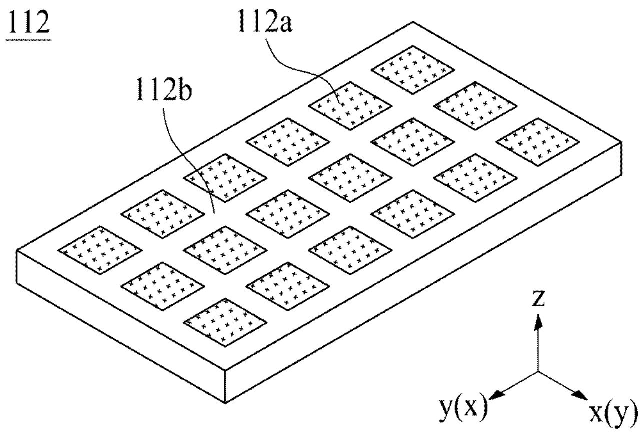
FIG. 32 is a perspective view illustrating a vibration layer of a vibration device according to a seventh embodiment of the present disclosure.

FIG. 32 is a perspective view illustrating a vibration layer of a vibration device according to the present embodiment. In each of the vibration device 11 and the vibration device 21 according to present embodiment, a vibration layer 112 of the vibration generating portion 11A may include a plurality of first portions 112*a* and a second portion 112*b*.

For example, the vibration layer 112 may include a plurality of first portions 112*a* and a second portion 112*b* which is disposed between the plurality of first portions 112*a*.

Each of the plurality of first portions 112*a* may be disposed to be spaced apart from one another along each of the x-axis direction and the y-axis direction. For example, each of the plurality of first portions 112*a* may have a hexahedral shape (or a six-sided object shape), for example, having a same size and may be disposed in a lattice shape, without being limited thereto. Each of the plurality of first portions 112*a* may be substantially a same as the first portion 112*a* described above with reference to FIG. 31, and thus, repeated descriptions are omitted.

The second portion 112*b* may be disposed between the plurality of first portions 112*a* along each of the x-axis direction and the y-axis direction, or any other direction between the x-axis direction and the y-axis direction. The second portion 112*b* may be configured to fill a gap or a space between two adjacent first portions 112*a* or to surround each of the plurality of first portions 112*a*, and thus, the second portion 112*b* may be connected to or attached on lateral surface of adjacent first portion 112*a*. The second portion 112*b* may be substantially a same as the second portions 112*b* described above with reference to FIG. 31, and thus, repeated descriptions are omitted or briefly given.

A first surface of each of the plurality of first portions 112*a* and the second portion 112*b* may be connected to a first electrode in common. A second surface of each of the plurality of first portions 112*a* and the second portion 112*b* may be connected to a second electrode in common.

In each of the vibration device 11 and the vibration device 21 according to the seventh embodiment of the present disclosure, the plurality of first portions 112*a* and the second portion 112*b* may be disposed on (or connected to) a same plane, and thus, the vibration layer 112 may have a single thin film-type. Accordingly, each of the vibration device 11 and the vibration device 21 may be vibrated in a vertical direction by the first portions 112*a* having a vibration characteristic and may be bent in a curved shape by the second portions 112*b* having flexibility. For example, each of the vibration device 11 and the vibration device 21 including the vibration layer 112 may have a 1-3 composite structure, and thus, may have a resonance frequency of 20 kHz or less, but embodiments of the present disclosure are not limited thereto.

Eighth Embodiment

In present embodiment, a modification example of the structure of a vibration device in the sound apparatus 1 according to the eighth embodiment of the present disclosure will be described.

Figure 33:
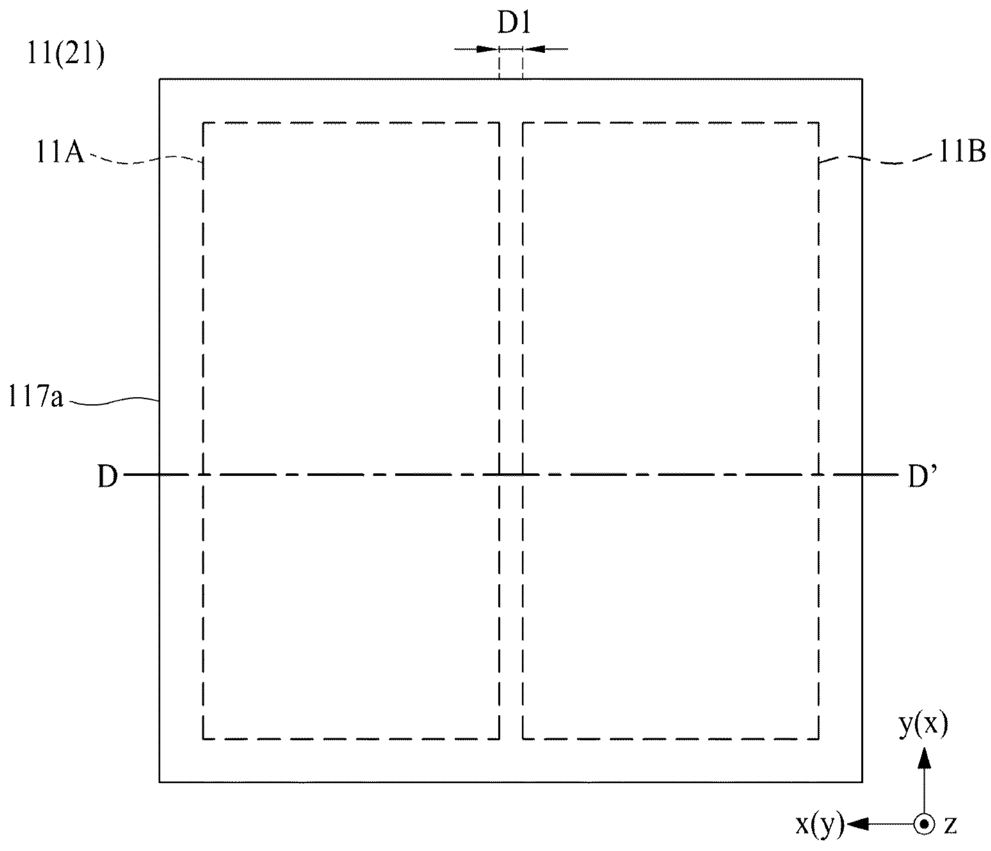
FIG. 33 is a plan view illustrating a configuration of a vibration device according to an eighth embodiment of the present disclosure.
Figure 34:
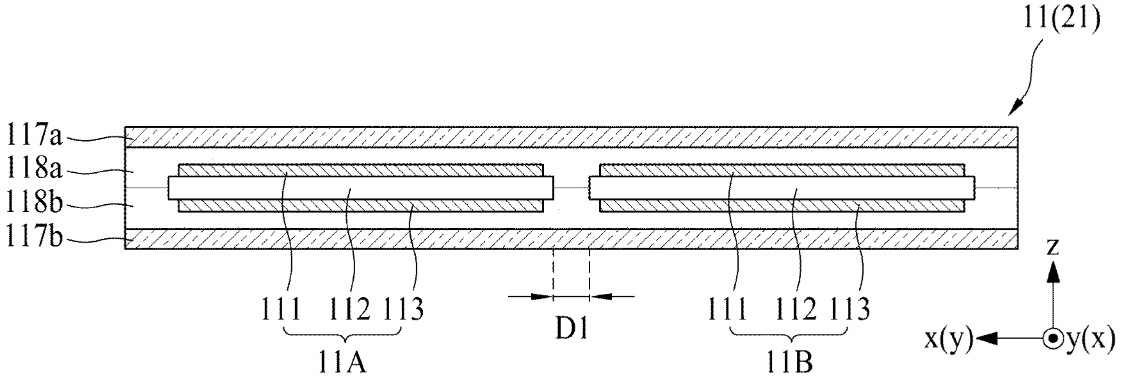
FIG. 34 is a cross-sectional view illustrating a configuration of a vibration device according to an eighth embodiment of the present disclosure.

FIG. 33 is a plan view illustrating a configuration of a vibration layer of a sound apparatus according to present embodiment. FIG. 34 is a cross-sectional view taken along line D-D' of FIG. 33. As illustrated in FIGS. 33 and 34, each of a vibration device 11 and a vibration device 21 according to present embodiment may include at least two or more vibration generating portions (or vibration portions) 11A and 11B. For example, each of the vibration device 11 and the vibration device 21 may include a first vibration generating portion 11A and a second vibration generating portion 11B.

The first and second vibration generating portions 11A and 11B may be electrically separated and disposed while being spaced apart from each other along one direction (e.g., the x-axis direction, the y-axis direction or any other direction therebetween). Each of the first and second vibration generating portions 11A and 11B may alternately and repeatedly contract and/or expand based on a piezoelectric effect to vibrate. For example, the first and second vibration generating portions 11A and 11B may be disposed or tiled in a first interval D1 along the one direction (e.g., x-axis (or y-axis) direction). Each of the first and second vibration generating portions 11A and 11B may be disposed or tiled on a same plane, and thus, each of the vibration device 11 and the vibration device 21 may have an enlarged area based on tiling of the first and second vibration generating portions 11A and 11B having a relatively small size. Thus, each of the vibration device 11 and the vibration device 21 in which the first and second vibration generating portions 11A and 11B are tiled may be a vibration array, a vibration array portion, a vibration module array portion, a vibration array structure, a tiling vibration array, a tiling vibration array module, or a tiling vibration film, but embodiments of the present disclosure are not limited thereto.

Each of the first and second vibration generating portions 11A and 11B may be disposed or tiled in the first interval D1, and thus, may be implemented as one vibration apparatus (or a single vibration apparatus) which is driven as one complete single-body without being independently driven. With respect to the x-axis direction, the first interval D1 between the first and second vibration generating portions 11A and 11B may be 0.1 mm or more and less than 3 cm, but embodiments of the present disclosure are not limited thereto.

The first and second vibration generating portions 11A and 11B may be disposed in the first interval D1 of 0.1 mm or more and less than 5 mm, increasing a reproduction band of a sound generated by interconnecting a single-body vibration of the first and second vibration generating portions 11A and 11B and increasing a sound of a low-pitched sound band (for example, a sound pressure level characteristic in 500 Hz (hertz) or less). For example, when the first and second vibration generating portions 11A and 11B are disposed in the first interval D1 of less than 0.1 mm or without the first interval D1, the reliability of the first and second vibration generating portions 11A and 11B or the vibration device 11 and the vibration device 21 in may be reduced due to damage or a crack caused by a physical contact therebetween which occurs when each of the first and second vibration generating portions 11A and 11B vibrates.

Each of the first and second vibration generating portions 11A and 11B may include a vibration layer 112, a first electrode 111 at a first surface of the vibration layer 112, and a second electrode 113 at a second surface different from (or opposite to) the first surface of the vibrating layer 112. The vibration layer 112 is substantially a same as the vibration layer 112 described above with reference to FIG. 6, and thus, repeated descriptions are omitted or briefly given. According to another modification example of the present disclosure, the vibration layer 112 may include a plurality of first portions 112*a* and a plurality of second portion 112*b* in a same manner as the modification embodiment illustrated in FIG. 31, or the vibration layer 112 may include a plurality of first portions 112*a* and a second portion 112*b* in a same manner as the modification embodiment illustrated in FIG. 32, and thus, repeated descriptions are omitted or briefly given.

The first electrode 111 and the second electrode 113 may be disposed with the vibration layer 112 therebetween in a thickness direction and may be configured to apply a voltage to the vibration layer 112. A polarization direction of the vibration layer 112 may be a forward direction or a sub-direction of the z-axis. Also, wires (or lines) for applying a voltage to each electrode may be connected to the electrodes 111 and 113 by soldering or the like.

Each of the vibration device 11 and the vibration device 21 according to present embodiment may further include a first protection layer (or a first protection member) 117*a* and a second protection layer (or a second protection member) 117*b*. The first protection layer 117*a* may be connected to a first surface (or a front surface or an upper surface) of each of the first and second vibration generating portions 11A and 11B in common. The first protection layer 117*a* may protect the first surface of each of the first and second vibration generating portions 11A and 11B. The second protection layer 117*b* may be connected to a second surface (or a rear surface or a lower surface) of each of the first and second vibration generating portions 11A and 11B in common. The second protection layer 117*b* may protect the second surface of each of the first and second vibration generating portions 11A and 11B. For example, any one of the first protective layer 117*a* and the second protective layer 117*b* of the first vibration device 11 may be connected to the first substrate 13 through an adhesive layer. For example, any one of the first protective layer 117*a* and the second protective layer 117*b* of the second vibration device 21 may be connected to the second substrate 23 through an adhesive layer.

The first protection layer 117*a* may be connected or coupled to the first electrode 111 by a first adhesive layer 118*a*. The second protection layer 117*b* may be connected or coupled to the second electrode 113 by a second adhesive layer 118*b*. The first adhesive layer 118*a* and the second adhesive layer 118*b* may be configured at a region between the first protection layer 117*a* and the second protection layer 117*b* to surround the first and second vibration generating portions 11A and 11B. For example, the first adhesive layer 118*a* and second adhesive layer 118*b* may be configured at a region between the first protection layer 117*a* and the second protection layer 117*b* to completely surround the first and second vibration generating portions 11A and 11B, without being limited thereto. The first adhesive layer 118*a* and second adhesive layer 118*b* may be connected to each other at a region between the first vibration generating portion 11A and the second vibration generating portion 11B. For example, the first and second vibration generating portions 11A and 11B may be embedded or built-in at a region between the first adhesive layer 118*a* and the second adhesive layer 118*b*.

Ninth Embodiment

In present embodiment, a detailed configuration example will be described where the sound apparatus 1 according to the first to eighth embodiments of the present disclosure is a display apparatus and the vibration member 90 performs a function of a display panel of the display apparatus. Descriptions of common elements which are a same as the first to eighth embodiments of the present disclosure are omitted or will be briefly given below.

Figure 35:
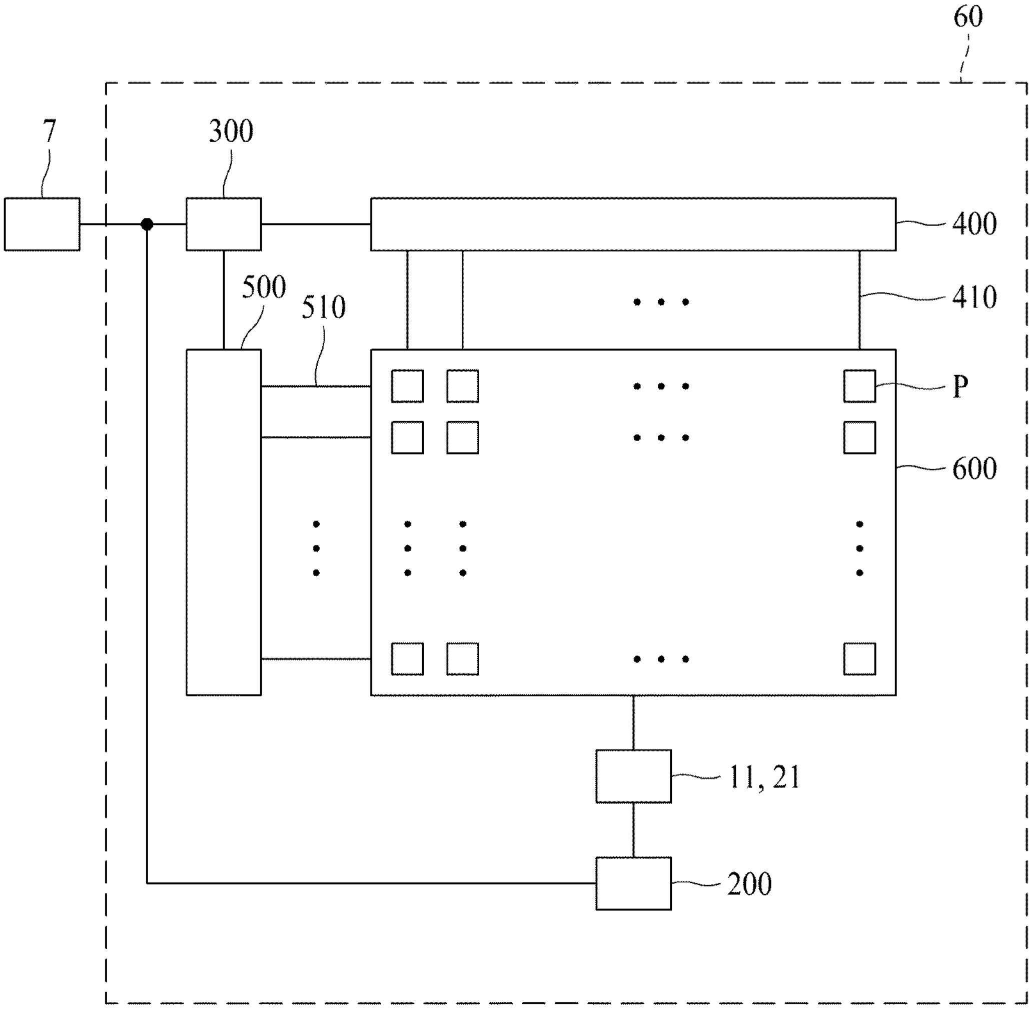
FIG. 35 is a diagram illustrating a display apparatus according to a ninth embodiment of the present disclosure.

FIG. 35 is a configuration diagram of a display apparatus 60 according to the ninth embodiment of the present disclosure. The use purpose of the display apparatus 60 according to an embodiment of the present disclosure may be, for example, electronic posters, digital bulletin boards, electronic advertisement signboards, computer screens, or television receivers, or the like, but embodiments of the present disclosure are not limited thereto. A host system 7 and a structure of vibration devices 11 and 21 may be a same as one of the first to fourth embodiments of the present disclosure, and thus, repeated descriptions are omitted or briefly given. Moreover, although not shown in FIG. 35, the first substrate 13, the second substrate 23, the first elastic member 31, and the second elastic member 33 or the like according to the first to fourth embodiments of the present disclosure may be connected to the vibration devices 11 and 21.

As illustrated in FIG. 35, the display apparatus 60 may include vibration devices 11 and 21, a controller 200, a panel controller 300, a data driving circuit 400, a gate driving circuit 500, and a display panel 600. The display apparatus 60 may be an apparatus which displays an image by a display panel 600 based on RGB data (or RGBW data) or the like input thereto and generates a sound based on a sound signal or the like input thereto.

The panel controller 300 may control the data driving circuit 400 and the gate driving circuit 500 based on image data and a timing signal input from the host system 7. The data driving circuit 400 may supply data voltages or the like to a plurality of pixels P through a driving line 410 disposed at each column of the plurality of pixels P. The gate driving circuit 500 may supply a control signal to the plurality of pixels P through a driving line 510 disposed at each row of the plurality of pixels P. Moreover, each of the driving line 410 and the driving line 510 may be provided in a plurality lines, without being limited thereto.

The display panel 600 may include the plurality of pixels P disposed to configure a plurality of rows and a plurality of columns. The display apparatus 600 may be, for example, an organic light emitting diode (OLED) display using the display panel 600 where an OLED is provided as a light emitting device of the pixel P. Alternatively, the display apparatus 60 may be a liquid crystal display (LCD) where a liquid crystal panel including a liquid crystal material and a polarizer, or the like is used as the display panel 600. Based on such a structure, the display panel 600 may be thinned, and thus, the structure may be suitable for thinning the display apparatus 60. When the display apparatus 60 is capable of displaying a color image, the pixel P may be a subpixel which displays one of a plurality of colors (for example, RGB or RGBW data) implementing a color image.

Each of the controller 200, the panel controller 300, the data driving circuit 400, and the gate driving circuit 500 may be configured by one semiconductor IC or a plurality of semiconductor ICs. Moreover, some or all of the controller 200, the panel controller 300, the data driving circuit 400, and the gate driving circuit 500 may be integrally configured as one semiconductor IC (or one body or a single body).

The display apparatus 60 according to an embodiment of the present disclosure may be supplied with an image signal (for example, RGB data or RGBW data), a sound signal and a timing signal (a vertical synchronization signal, a horizontal synchronization signal, and a data enable signal, or the like) from the host system 7, and thus, may display an image and simultaneously may generate a sound, without being limited thereto. As an example, at least one of the image signal (for example, RGB data or RGBW data) and the timing signal (a vertical synchronization signal, a horizontal synchronization signal, and a data enable signal, or the like) may be supplied from a separate component other than the host system 7. The display panel 600 may include an image display surface configured to display an image and a rear surface (or a backside surface) which is opposite to the image display surface. The vibration devices 11 and 21 may be connected to the rear surface of the display panel 600. Therefore, the display panel 600 may include a function of displaying an image and a function of the vibration member 90 in the first to fourth embodiments of the present disclosure. Accordingly, in present embodiment, the display apparatus 60 having an acoustic effect where a sound is output from an image displayed by the display panel 600 may be provided. Embodiments are not limited thereto. As an example, the display apparatus 60 may further include a vibration member 90 separated from the display panel 600.

A sound apparatus according to an embodiment of the present disclosure may be applied to a sound apparatus disposed or included at an apparatus. The apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic book, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game apparatuses, notebook computers, monitors, cameras, camcorders, home appliances, etc. Moreover, the sound apparatus according to an embodiment of the present disclosure may be applied to or included into organic light-emitting lighting apparatuses or inorganic light-emitting lighting apparatuses. When the sound apparatus of an embodiment of the present disclosure is applied to or included into lighting apparatuses, the lighting apparatus may act as lighting and a speaker. Furthermore, when the sound apparatus of an embodiment of the present disclosure is applied to or included into a mobile device, or the like, the sound apparatus may act as one or more of a speaker, a receiver, and a haptic apparatus, but embodiments of the present disclosure are not limited thereto.

A sound apparatus according to an embodiment of the present disclosure will be described below.

A sound apparatus according to an embodiment of the present disclosure may comprise a first vibration device which vibrates by an input driving signal; a first substrate which includes a first main surface and a second main surface facing each other, wherein the first vibration device is disposed on at least a portion of the first main surface of the first substrate; a second substrate which includes a first main surface and a second main surface facing each other, wherein a portion of the first main surface of the second substrate is disposed to be adjacent to a portion of the second main surface of the first substrate; a second vibration device which is disposed on at least a portion of the second main surface of the second substrate and vibrates by the input driving signal; a vibration member; a first member configured to connect the first substrate and the vibration member; and a second member configured to connect the first substrate and the vibration member.

According to one or more embodiments of the present disclosure, the first member may be in contact with the second main surface of the first substrate.

According to one or more embodiments of the present disclosure, the first member may be disposed at an area where the first substrate and the first vibration device overlap on a plan view.

According to one or more embodiments of the present disclosure, the first vibration device may have a rectangular shape including a long side direction and a short side direction, and an edge portion of one side of the first member may be disposed at a position corresponding to an edge portion of the long side direction of the first vibration device.

According to one or more embodiments of the present disclosure, the second vibration device may be disposed on at least a portion of the second main surface of the second substrate, and the second member may be configured to connect the second vibration device to the vibration member.

According to one or more embodiments of the present disclosure, the second vibration device may be disposed on a portion of the second main surface of the first substrate and on at least a portion of the first main surface of the second substrate, and the second member may be configured to connect the second substrate to the vibration member.

According to one or more embodiments of the present disclosure, the first member and the second member may be elastic members.

According to one or more embodiments of the present disclosure, the first vibration device and the second vibration device may vibrate by the same input driving signal.

According to one or more embodiments of the present disclosure, a polarization direction of a vibration layer of the first vibration device may be opposite to a polarization direction of a vibration layer of the second vibration device, and an applied voltage of the vibration layer of the first vibration device may be opposite to an applied voltage of the vibration layer of the second vibration device.

According to one or more embodiments of the present disclosure, the first vibration device and the second vibration device may be displaced in the same direction.

According to one or more embodiments of the present disclosure, the second member may be in contact with the second vibration device.

According to one or more embodiments of the present disclosure, the second member may be disposed at an area where the second substrate and the second vibration device overlap on a plan view.

According to one or more embodiments of the present disclosure, the second vibration device may have a rectangular shape including a long side direction and a short side direction, and an edge portion of one side of the second member may be disposed at a position corresponding to an edge portion of the long side direction of the second vibration device.

A sound apparatus according to an embodiment of the present disclosure may comprise a first vibration device which vibrates by an input driving signal; a first substrate which includes a first main surface and a second main surface facing each other, wherein the first vibration device is disposed on at least a portion of the first main surface of the first substrate; a second vibration device which is disposed on a portion of the second main surface of the first substrate and vibrates by the input driving signal; a second substrate which includes a first main surface and a second main surface facing each other, wherein at least a portion of the first main surface of the second substrate may be disposed to be adjacent to the second vibration device; a vibration member; a first member configured to connect the first substrate and the vibration member; and a second member configured to connect the second substrate and the vibration member.

According to one or more embodiments of the present disclosure, the first member may be in contact with the second main surface of the first substrate, and the first member may be disposed in an area where the first substrate and the first vibration device overlap on a plan view.

According to one or more embodiments of the present disclosure, the first vibration device may have a rectangular shape including a long side direction and a short side direction, and an edge portion of one side of the first member may be disposed at a position corresponding to an edge portion of the long side direction of the first vibration device.

According to one or more embodiments of the present disclosure, the second member may be in contact with the second main surface of the second substrate, and the second member may be disposed at an area where the second substrate and the second vibration device overlap on a plan view.

According to one or more embodiments of the present disclosure, the second vibration device may have a rectangular shape including a long side direction and a short side direction, and an edge portion of one side of the second member may be disposed at a position corresponding to an edge portion of the long side direction of the second vibration device.

According to one or more embodiments of the present disclosure, at least one of the first substrate and the second substrate may include stainless steel.

According to one or more embodiments of the present disclosure, at least one of the first substrate and the second substrate may have a thickness of 0.1 mm to 0.5 mm.

According to one or more embodiments of the present disclosure, at least one of the first substrate and the second substrate may have a thickness of 0.2 mm to 0.4 mm.

According to one or more embodiments of the present disclosure, the first substrate and the first vibration device may have a rectangular shape including a long side direction and a short side direction, and a length of the long side direction of the first substrate may be longer than a length of the long side direction of the first vibration device.

According to one or more embodiments of the present disclosure, the second substrate and the second vibration device may have a rectangular shape including a long side direction and a short side direction, and a length of the long side direction of the second substrate may be longer than a length of the long side direction of the second vibration device.

According to one or more embodiments of the present disclosure, the first substrate, the first vibration device, the second substrate, and the second vibration device may have a rectangular shape including a long side direction and a short side direction, and a length of at least one long side direction of the first substrate and the second substrate may be a same as a length of at least one long side direction of the first vibration device and the second vibration device.

According to one or more embodiments of the present disclosure, the first substrate, the first vibration device, the second substrate, and the second vibration device may have a rectangular shape including a long side direction and a short side direction, and the long side direction of the first substrate and the long side direction of the first vibration device may extend in a first direction, the long side direction of the second substrate and the long side direction of the second vibration device may extend in a second direction, and the first substrate and the first vibration device may intersect the second substrate and the second vibration device on a plan view.

According to one or more embodiments of the present disclosure, the vibration member may be a display panel of a display apparatus, the display panel includes an image display surface on which an image may be displayed, and a rear surface confronting the image display surface, and the vibration of the first vibration device and the second vibration device may be transmitted to the rear surface of the display panel.

According to one or more embodiments of the present disclosure, the first substrate and the second substrate may be disposed to include a "+" shape on a plan view.

According to one or more embodiments of the present disclosure, the vibration member may be configured as material of metal, resin, glass, hard paper, wood, rubber, plastic, fiber, cloth, paper, leather, or carbon, or the vibration member may include a display panel including a pixel configured to display an image, a screen panel on which an image is projected from a display apparatus, a lighting panel, a light emitting diode lighting panel, an organic light emitting lighting panel, an inorganic light emitting lighting panel, a signage panel, a vehicular interior material, a vehicular glass window, a vehicular exterior material, a vehicular seat interior material, a building ceiling material, a building interior material, a building glass window, an aircraft interior material, an aircraft glass window, or a mirror.

A sound apparatus according to an embodiment of the present disclosure may comprise a vibration member, first and second substrates intersecting each other, a first vibration device connected to the first substrate, a second vibration device connected to the second substrate, and a transmission member for transmitting a vibration of each of the first and second substrates to the vibration member.

According to one or more embodiments of the present disclosure, the sound apparatus may further include an adhesive between the first substrate and the second substrate, an elastic modulus of the adhesive is lower than that of an elastic member.

According to one or more embodiments of the present disclosure, the transmission member may include a plurality of first elastic members connected between the first substrate and the vibration member, and a plurality of second elastic members connected between the second substrate and the vibration member.

According to one or more embodiments of the present disclosure, the plurality of second elastic members may be connected to the second substrate to be overlapped with the second vibration device.

According to one or more embodiments of the present disclosure, the transmission member may include a plurality of first elastic members connected between the first substrate and the vibration member, and a plurality of second elastic members connected between the second vibration device and the vibration member.

According to one or more embodiments of the present disclosure, the plurality of first elastic members may be connected to the first substrate to overlap with the first vibration device.

According to one or more embodiments of the present disclosure, the transmission member may include five second elastic members disposed to be overlapped with each corner portion and central portion of the second vibration device.

According to one or more embodiments of the present disclosure, the transmission member may include nine second elastic members disposed to be overlapped with each corner portion and central portion of the second vibration device, and each middle portion between the corner portion and the central portion.

According to one or more embodiments of the present disclosure, each of the first vibration device and the first vibration device may include a vibration generating portion, and the vibration generating portion may include a vibration layer including a plurality of first portion and one or more second portion between the plurality of first portions, a first electrode at a first surface of the vibration layer, and a second electrode at a second surface different from the first surface of the vibration layer.

According to one or more embodiments of the present disclosure, the plurality of first portions may include an inorganic material having a piezoelectric characteristic, the one or more second portion may include an organic material having a ductile characteristic.

According to one or more embodiments of the present disclosure, each of the first vibration device and the first vibration device may further include a first protection member at a first surface of the vibration generating portion, and a second protection member at a second surface different from the first surface of the vibration generating portion.

According to one or more embodiments of the present disclosure, each of the first vibration device and the first vibration device may further include a first adhesive layer between the vibration generating portion and the first protection member, and a second adhesive layer between the vibration generating portion and the second protection member.

According to one or more embodiments of the present disclosure, each of the first vibration device and the first vibration device may include at least two or more vibration generating portions, and each of the at least two or more vibration generating portions may include a vibration layer, a first electrode at a first surface of the vibration layer, and a second electrode at a second surface different from the first surface of the vibration layer.

According to one or more embodiments of the present disclosure, each of the first vibration device and the first vibration device may further include a first protection member connected to a first surface of each of the at least two or more vibration generating portions in common, and a second protection member connected to a second surface of each of the at least two or more vibration generating portions in common.

According to one or more embodiments of the present disclosure, each of the first vibration device and the first vibration device may further include a first adhesive layer between the at least two or more vibration generating portions and the first protection member, and a second adhesive layer between the at least two or more vibration generating portions and the second protection member.

According to one or more embodiments of the present disclosure, the first adhesive layer and the second adhesive layer may be connected to each other between the at least two or more vibration generating portions.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination of various embodiments and modifications of them should be construed as being within the scope of the present disclosure. It will be apparent to those skilled in the art that various modifications and variations can be made in the present disclosure without departing from the spirit or scope of the disclosures, including combining some aspects of the various embodiments with each other to achieve an embodiment different from those exactly disclosure herein. Thus, it is intended that the present disclosure covers the modifications and variations of this disclosure provided they come within the scope of the appended claims and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A sound apparatus, comprising:

a first vibration device configured to vibrate based on an input driving signal;

a first substrate having a first main surface and a second main surface opposite to the first main surface, wherein the first vibration device is disposed on the first main surface of the first substrate;

a second substrate having a first main surface and a second main surface opposite to the first main surface, wherein a portion of the first main surface of the second substrate is disposed to face a portion of the second main surface of the first substrate;

a second vibration device which is disposed on the second main surface of the second substrate and configured to vibrate based on the input driving signal;

a vibration member;

a first member configured to connect the second main surface of the first substrate to the vibration member; and a second member configured to connect an edge portion of a rear surface of the second vibration device or the second main surface of the second substrate to the vibration member, wherein:

the first member and the second member are made of different materials from the first substrate and the second substrate;

the rear surface of the second vibration device faces the vibration member; and a central portion other than the edge portion among the rear surface of the second vibration device is not connected to the vibration member.

2. The sound apparatus of claim 1, wherein the first member is in contact with the second main surface of the first substrate.

3. The sound apparatus of claim 1, wherein the first member is disposed at an area where the first substrate and the first vibration device overlap on a plan view.

4. The sound apparatus of claim 3, wherein:

the first vibration device has a rectangular shape including a long side direction and a short side direction; and an edge portion of one side of the first member is disposed at a position corresponding to an edge portion of the long side direction of the first vibration device.

5. The sound apparatus of claim 1, wherein the second vibration device is disposed on at least a portion of the second main surface of the second substrate, and the second member is configured to connect the rear surface of the second vibration device to the vibration member.

6. The sound apparatus of claim 1, wherein;

the second vibration device is disposed on a portion of the second main surface of the second substrate; and the second member is configured to connect the edge portion of the second main surface of the second substrate to the vibration member.

7. The sound apparatus of claim 1, wherein the first member and the second member are elastic members.

8. The sound apparatus of claim 1, wherein the first vibration device and the second vibration device vibrate by the same input driving signal.

9. The sound apparatus of claim 8, wherein;

a polarization direction of a vibration layer of the first vibration device is opposite to a polarization direction of a vibration layer of the second vibration device; and an applied voltage of the vibration layer of the first vibration device is opposite to an applied voltage of the vibration layer of the second vibration device.

10. The sound apparatus of claim 8, wherein the first vibration device and the second vibration device are displaced in the same direction.

11. The sound apparatus of claim 1, wherein the second member is in contact with the rear surface of the second vibration device or the second main surface of the second substrate.

12. The sound apparatus of claim 1, wherein the second member is disposed at an area where the second substrate and the second vibration device overlap on a plan view.

13. The sound apparatus of claim 12, wherein;

the second vibration device has a rectangular shape including a long side direction and a short side direction; and an edge portion of one side of the second member is disposed at a position corresponding to an edge portion of the long side direction of the second vibration device.

14. The sound apparatus of claim 1, wherein at least one of the first substrate and the second substrate includes stainless steel.

15. The sound apparatus of claim 1, wherein at least one of the first substrate and the second substrate has a thickness of 0.1 mm to 0.5 mm.

16. The sound apparatus of claim 15, wherein at least one of the first substrate and the second substrate has a thickness of 0.2 mm to 0.4 mm.

17. The sound apparatus of claim 1, wherein;

the first substrate and the first vibration device have a rectangular shape including a long side direction and a short side direction, and a length of the long side direction of the first substrate is longer than or equal to a length of the long side direction of the first vibration device.

18. The sound apparatus of claim 1, wherein;

the second substrate and the second vibration device have a rectangular shape including a long side direction and a short side direction; and a length of the long side direction of the second substrate is longer than or equal to a length of the long side direction of the second vibration device.

19. The sound apparatus of claim 1, wherein:

the first substrate, the first vibration device, the second substrate, and the second vibration device have a rectangular shape including a long side direction and a short side direction;

the long side direction of the first substrate and the long side direction of the first vibration device extend in a first direction;

the long side direction of the second substrate and the long side direction of the second vibration device extend in a second direction different from the first direction; and the first substrate and the first vibration device intersect the second substrate and the second vibration device on a plan view.

20. The sound apparatus of claim 1, wherein;

the vibration member is a display panel of a display apparatus;

the display panel includes an image display surface on which an image is displayed, and rear surface confronting the image display surface; and the vibration of the first vibration device and the second vibration device is transmitted to the rear surface of the display panel.

21. The sound apparatus of claim 1, wherein the first substrate and the second substrate are disposed to include a "+" shape on a plan view.

22. The sound apparatus of claim 1, wherein;

the vibration member includes at least one of a metal, resin, glass, hard paper, wood, rubber, plastic, fiber, cloth, paper, leather, or carbon; and the vibration member includes a display panel configured to display an image.

23. The sound apparatus of claim 1, wherein the vibration member includes a screen panel on which an image is projected from a display apparatus, a lighting panel, a signage panel, a vehicular interior material, a vehicular glass window, a vehicular exterior material, a vehicular seat interior material, a building ceiling material, a building interior material, a building glass window, an aircraft interior material, an aircraft glass window, or a mirror.

24. The sound apparatus of claim 1, wherein;

the first member includes a plurality of first members; and the second member includes a plurality of second members.

* * * * *